(12) United States Patent
Sato et al.

(10) Patent No.: US 12,088,766 B2
(45) Date of Patent: Sep. 10, 2024

(54) READING APPARATUS WITH A DISPLACEABLE COVER MEMBER THAT COVERS A FEED PORT

(71) Applicant: SEIKO EPSON CORPORATION, Tokyo (JP)

(72) Inventors: Ryuichi Sato, Shiojiri (JP); Kazuki Mano, Nagano (JP); Kazuaki Takahashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/145,932

(22) Filed: Dec. 23, 2022

(65) Prior Publication Data

US 2023/0231959 A1 Jul. 20, 2023

(30) Foreign Application Priority Data

Dec. 28, 2021 (JP) ................. 2021-214263

(51) Int. Cl.
*H04N 1/00* (2006.01)
(52) U.S. Cl.
CPC ..... *H04N 1/00551* (2013.01); *H04N 1/00602* (2013.01)
(58) Field of Classification Search
CPC .......... H04N 1/00551; H04N 1/00554; H04N 1/00519
See application file for complete search history.

(56) References Cited

U.S. PATENT DOCUMENTS

2019/0160840 A1* 5/2019 Akahane ............ H04N 1/00551
2019/0306356 A1* 10/2019 Watanabe .......... H04N 1/00602

FOREIGN PATENT DOCUMENTS

JP 2019-172426 A 10/2019

* cited by examiner

*Primary Examiner* — Benjamin O Dulaney
(74) *Attorney, Agent, or Firm* — WORKMAN NYDEGGER

(57) ABSTRACT

A reading apparatus includes a reading part that reads information of a document, a housing that accommodates the reading part, a document feeding port feed the document therethrough, and a cover member that is disposed on the housing and is displaceable to an open position at which the document feeding port is opened and a closed position at which the document feeding port is closed, wherein the cover member includes an opening and closing end portion on an upstream side in a transport direction of the document, the housing includes a facing portion that is a portion facing a bottom surface of the opening and closing end portion when the cover member is at the closed position, and a gap through which the document passes is formed between a part or the whole of the bottom surface of the opening and closing end portion and the facing portion.

11 Claims, 12 Drawing Sheets

READING APPARATUS WITH A DISPLACEABLE COVER MEMBER THAT COVERS A FEED PORT

The present application is based on, and claims priority from JP Application Serial Number 2021-214263, filed Dec. 28, 2021, the disclosure of which is hereby incorporated by reference herein in its entirety.

BACKGROUND

1. Technical Field

The present disclosure relates to a reading apparatus that reads a document, and a complex machine.

2. Related Art

There is a scanner apparatus that is an example of a reading apparatus that reads a document. A scanner apparatus described in JP-A-2019-172426 includes a reading part that reads information of a document, a housing that accommodates the reading part, and a document feeding port formed in an upper surface of the housing to feed the document therethrough. In addition, the scanner apparatus described in JP-A-2019-172426 includes a cover member that covers the document feeding port from above to curb intrusion of foreign matter into the housing from the document feeding port.

However, in such a reading apparatus, the cover member is fixed, and the document feeding port is open to an extent that the document can be supplied to the document feeding port. Therefore, even when the cover member is provided, it is not sufficient to suppress the intrusion of foreign matter into the housing from the document feeding port. In addition, even in a case in which the cover member is displaceable such that the document feeding port is closed, the document is sandwiched between the cover member and the housing in the document feeding port when the cover member is displaced to a closed position during feeding of the document from the document feeding port. Thus, there is a possibility that transport resistance of the document from the document feeding port to the inside of the reading apparatus may increase.

SUMMARY

A reading apparatus to solve the problem described above includes a reading part that reads information of a document, a housing that accommodates the reading part, a document feeding port formed in an upper surface of the housing to feed the document therethrough, and a cover member disposed on the housing to be displaced to an open position at which the document feeding port is open and a closed position at which the document feeding port is closed, wherein the cover member includes an opening and closing end portion on the upstream side in a transport direction of the document fed from the document feeding port, the housing includes a facing portion that is a portion facing a bottom surface of the opening and closing end portion when the cover member is at the closed position, and a gap through which the document passes is formed between a part or the whole of the bottom surface of the opening and closing end portion and the facing portion when the cover member is at the closed position.

A complex machine to solve the problem described above includes a recording part that performs recording on a medium, a reading part that reads information of a document, a housing that accommodates the recording part and the reading part, a document feeding port formed in an upper surface of the housing to feed the document therethrough, and a cover member that is disposed on the housing and is displaceable to an open position at which the document feeding port is open and a closed position at which the document feeding port is closed, wherein the cover member includes an opening and closing end portion on an upstream side in a transport direction of the document fed from the document feeding port, the housing includes a facing portion that is a portion facing a bottom surface of the opening and closing end portion when the cover member is at the closed position, and when the cover member is at the closed position, a gap through which the document passes is formed between a part or the whole of the bottom surface of the opening and closing end portion and the facing portion.

DESCRIPTION OF EXEMPLARY EMBODIMENTS

Figure 1:
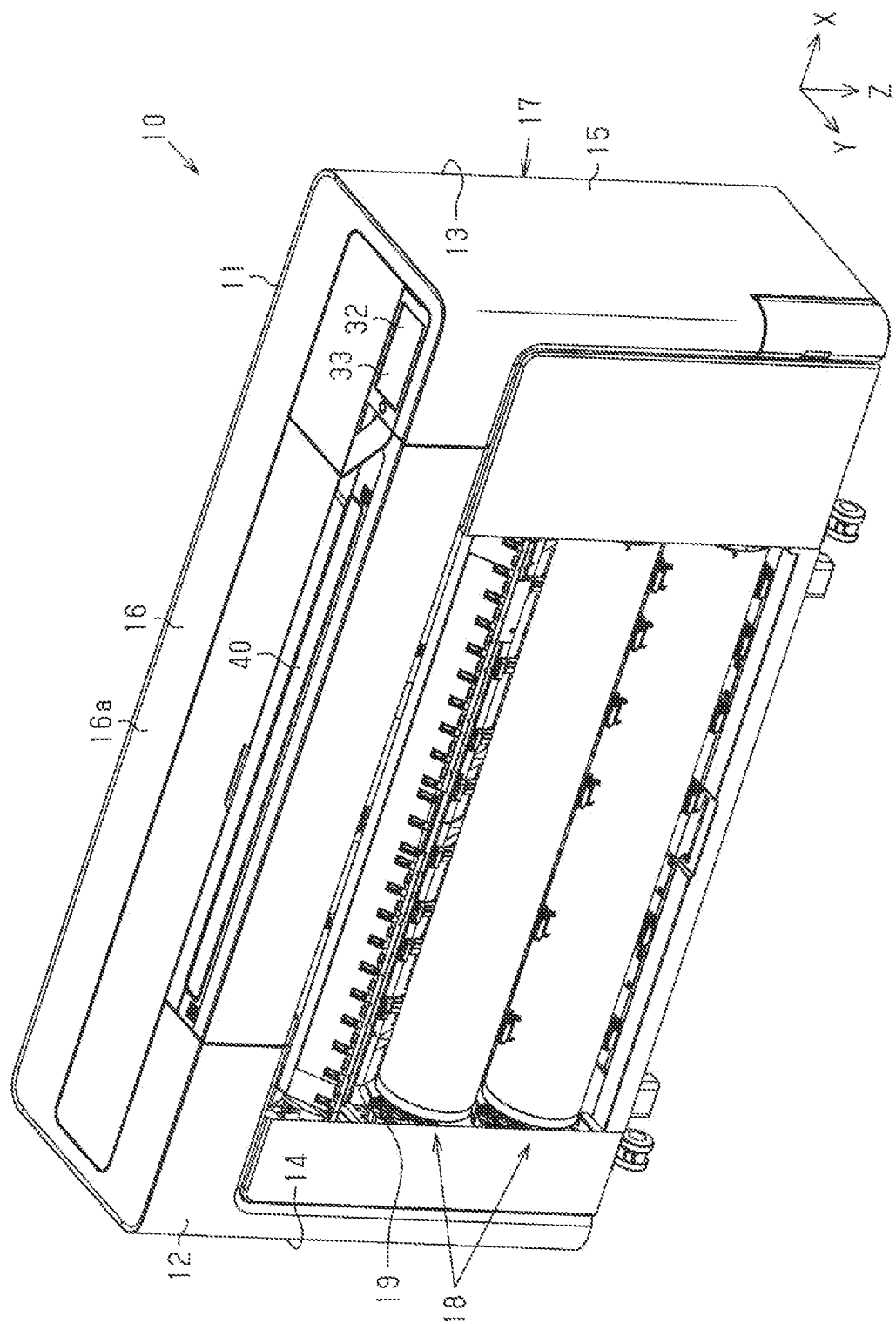
FIG. 1 is a perspective view of an embodiment of a reading apparatus.

Hereinafter, embodiments will be described with reference to the accompanying drawings. A reading apparatus 10 is an apparatus that reads information from a document 95. The reading apparatus 10 may be a complex machine. The reading apparatus 10 has a plurality of functions including a scanning function, a copy function, and a printing function. The reading apparatus 10 may have a facsimile function.

In the drawings, assuming that the reading apparatus 10 is placed on a horizontal plane, the direction of gravity is indicated by a Z-axis, and directions along the horizontal plane are indicated by an X-axis and a Y-axis. The X-axis, the Y-axis, and the Z-axis are orthogonal to each other. In the following description, a direction parallel to the X-axis is also referred to as a width direction X, a direction parallel to the Y-axis is also referred to as a depth direction Y, and a direction parallel to the Z-axis is also referred to as a vertical direction Z.

Reading Apparatus

As illustrated in FIG. 1, the reading apparatus 10 that is an example of a complex machine includes a housing 11. The housing 11 has a substantially rectangular shape. The housing 11 has a upper wall 16 and side walls 17. The side walls 17 may include a front wall 12, a rear wall 13, a first side wall 14, and a second side wall 15. The front wall 12 is located in the depth direction Y with respect to the rear wall 13. The second side wall 15 is located in the width direction X with respect to the first side wall 14. The second side wall 15 is coupled to an end portion of each of the front wall 12 and the rear wall 13 in the width direction X. The first side wall 14 is coupled to an end portion of each of the front wall 12 and the rear wall 13 in a direction opposite to the width direction X. The upper wall 16 is coupled to upper ends of the front wall 12, the rear wall 13, the first side wall 14, and the second side wall 15. An upper surface 16a of the upper wall 16 may be a plane that extends parallel to a horizontal plane. The upper surface 16a corresponds to an upper surface of the housing 11.

The reading apparatus 10 may include an input part 32 and a display part 33. A user can instruct the reading apparatus 10 by operating the input part 32. The display part 33 may be, for example, a touch panel. In this case, the input part 32 may be configured to have an operation function of the touch panel. The input part 32 may be configured of a mechanical switch. The display part 33 of the embodiment also functions as a notification part that notifies information.

The input part 32 and the display part 33 may be disposed on the housing 11. The input part 32 and the display part 33 may be disposed on the upper wall 16 of the housing 11. The input part 32 and the display part 33 may be disposed to be biased in the width direction X from a central portion of the housing 11 in the width direction X.

Figure 2:
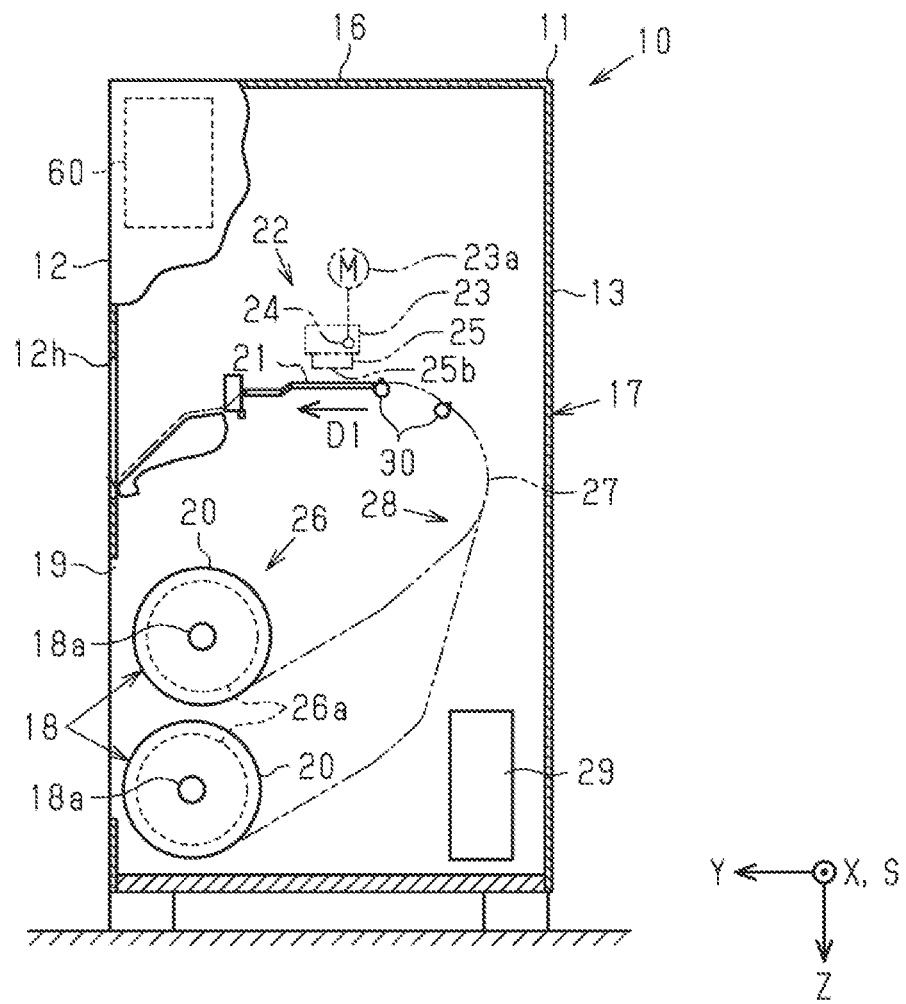
FIG. 2 is a schematic view illustrating the reading apparatus.

As illustrated in FIGS. 1 and 2, the reading apparatus 10 may include an installation portion 19 in which a cylindrical roll body 18 can be installed. The roll body 18 is formed to be wound around a core member 18a of a medium 20. Examples of the medium 20 include those of paper, fabric, and vinyl, and plastic parts, metal parts, and the like. A plurality of roll bodies 18 can be installed in the installation portion 19. Both ends of each of the roll bodies 18 in the width direction X are rotatably installed in a holding portion (not illustrated) in the installation portion 19. The installation portion 19 opens in a portion of the front wall 12 of the housing 11. The installation portion 19 constitutes a part of an internal space of the housing 11.

As illustrated in FIG. 2, the reading apparatus 10 may include a plate-shaped support 21 inside the housing 11. The support 21 is located above the installation portion 19. A dimension of the support 21 in the width direction X is greater than a dimension of the medium 20 in the width direction X. The support 21 can support the medium 20 on an upper surface thereof.

The reading apparatus 10 may include a feeding part 26 that feeds the medium 20, and a transport part 28 that transports the medium 20 along a transport path 27 indicated by a two-dot dashed line in FIG. 2. The housing 11 may accommodate the transport path 27. The transport path 27 may include the top of the support 21. The transport path 27 is coupled to a discharge port 12h that opens to the front wall 12.

The feeding part 26 rotates the roll body 18 by driving a drive motor 26a. As the roll body 18 rotates, the medium 20 is unwound from the roll body 18 and is delivered to the transport path 27.

The transport part 28 may include a plurality of transport roller pairs 30. The medium 20 is transported in a medium transport direction D1 in the transport path 27 by rotating the transport roller pairs 30 while the medium 20 is sandwiched therebetween. The medium transport direction D1 is a direction along the transport path 27. The medium transport direction D1 of the transport path 27 on the support 21 may be parallel to the Y-axis.

The reading apparatus 10 includes a recording part 22. The reading apparatus 10 may include a control part 29. The housing 11 may accommodate the recording part 22.

Recording Part

The recording part 22 performs recording on the medium 20. The recording part 22 may include a carriage 23 that moves in a scanning direction S, a rod-shaped guide shaft 24 that extends in the width direction X, and a carriage motor 23a. The scanning direction S may be a direction parallel to the X-axis. The carriage 23 is supported by the guide shaft 24. The carriage 23 can be reciprocated along the guide shaft 24 by driving the carriage motor 23a. The carriage 23 and the guide shaft 24 are separated upward from the support 21.

The recording part 22 includes a recording head 25 that performs recording on the medium 20. The recording head 25 includes a nozzle surface 25b in which nozzles (not illustrated) open. The recording head 25 is mounted in the carriage 23. The recording head 25 scans in the scanning direction S by moving together with the carriage 23. The recording head 25 moves to a position above the support 21 and away from the support 21 The nozzle surface 25b may be parallel to an upper surface of the support 21. The recording head 25 may perform recording on the medium 20 by discharging ink that is an example of a liquid from the nozzle to the medium 20 on the support 21. The recording head 25 of the embodiment is of a serial type that performs printing while moving in the width direction X of the medium 20. The recording head 25 may be configured to be of a line type provided in the width direction X of the medium 20.

Scanner Part

Figure 3:
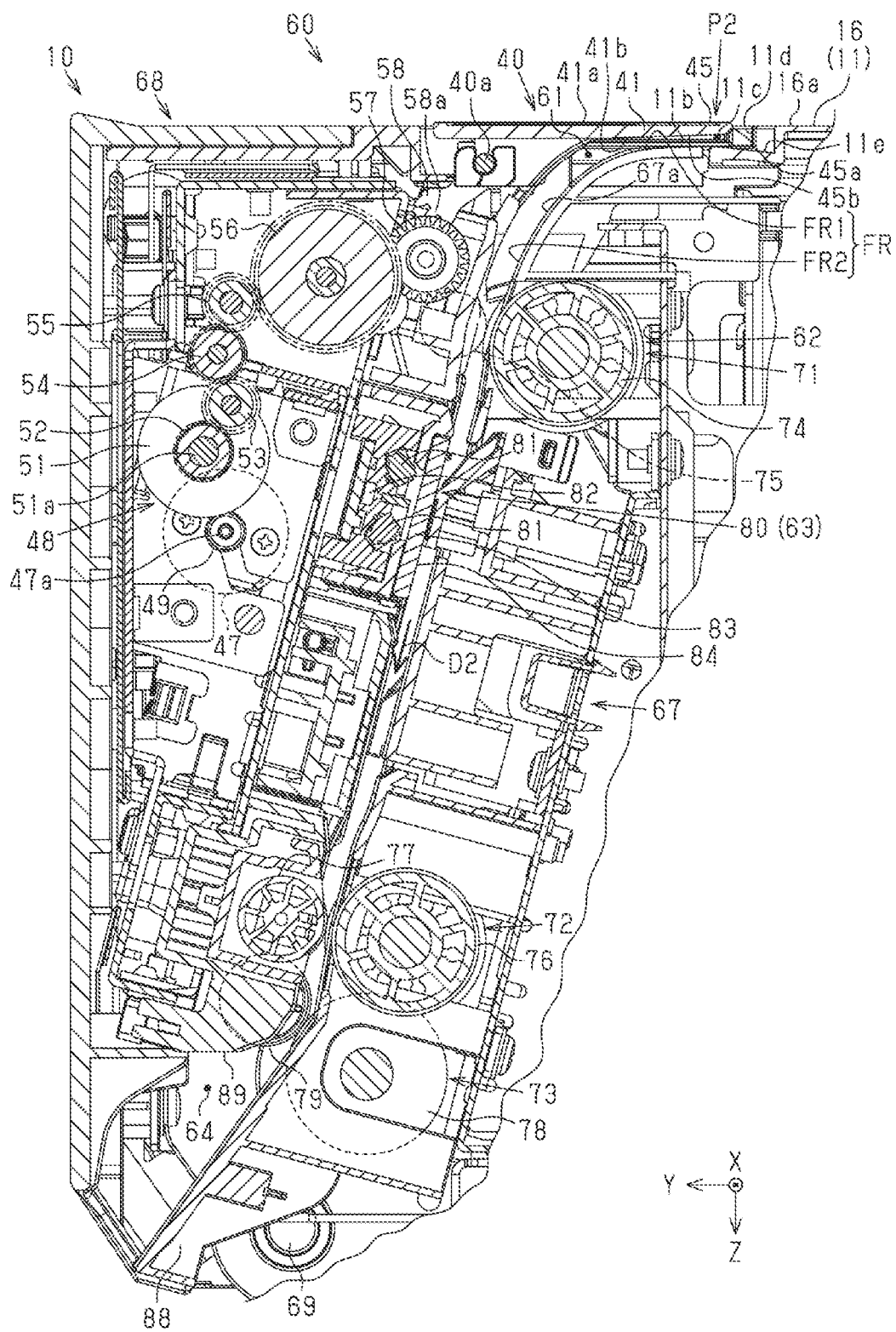
FIG. 3 is a cross-sectional view illustrating a scanner part.
Figure 4:
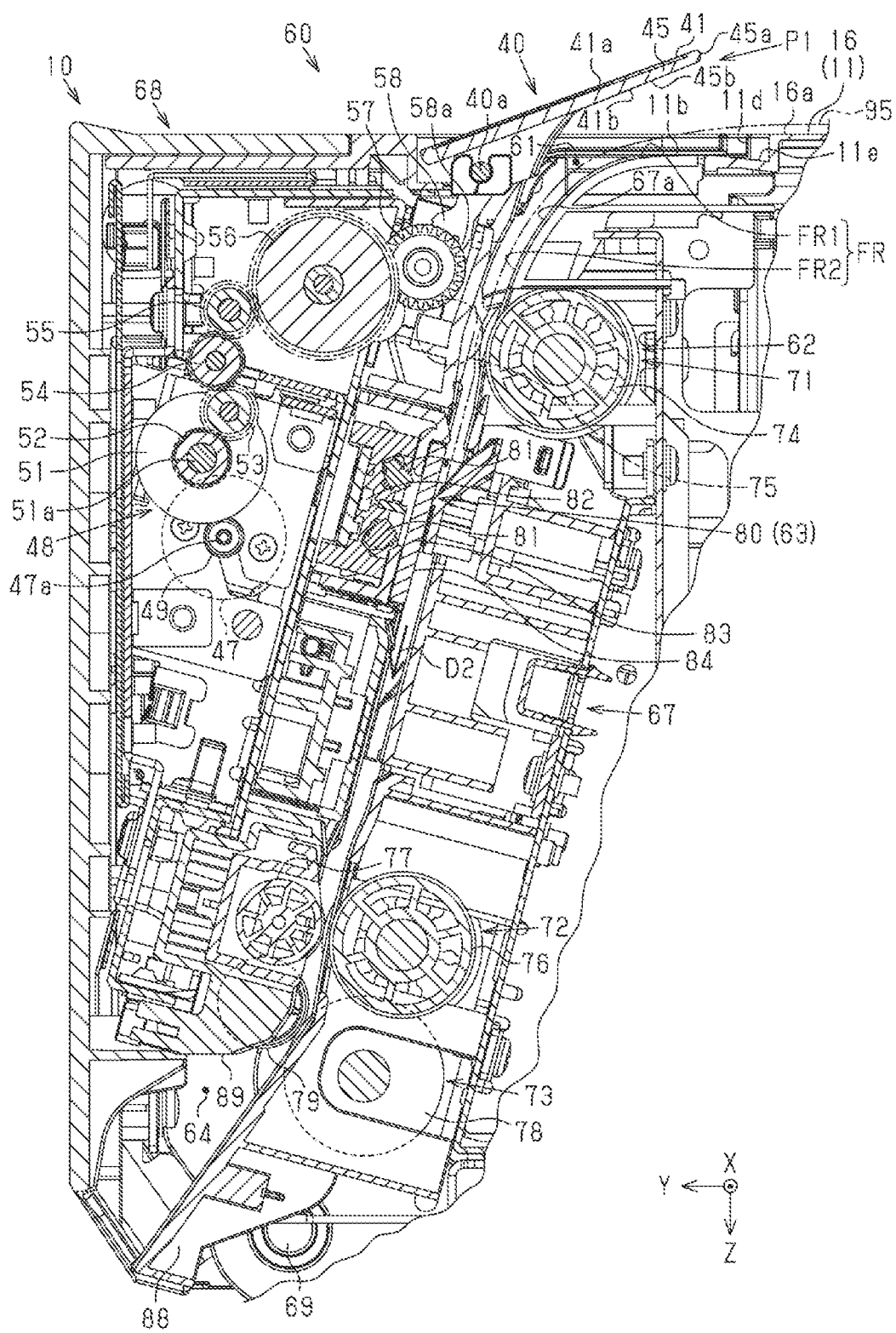
FIG. 4 is a cross-sectional view illustrating the scanner part.

As illustrated in FIGS. 3 and 4, the reading apparatus 10 may include a scanner part 60. The scanner part 60 includes a reading part 63, a document feeding port 61, and a cover member 40. The scanner part 60 may include a drive source 47. In other words, the reading apparatus 10 includes the reading part 63, the document feeding port 61, and the cover member 40. The reading apparatus 10 may include the drive source 47. The scanner part 60 may include a power transmission mechanism 48. The housing 11 accommodates the reading part 63.

The scanner part 60 includes a reading transport part 62 and a document discharge port 64. The reading transport part 62 transports the document 95 inserted from the document feeding port 61 along a reading transport path FR. The reading part 63 reads the document 95 transported by the reading transport part 62. The document discharge port 64 opens to the front wall 12 of the housing 11. The document discharge port 64 discharges the document 95, on which reading has been performed by the reading part 63, to the outside of the housing 11.

The scanner part 60 includes a base portion 67 and a reading part cover 68. The base portion 67 may constitute a part of the housing 11. A portion of the housing 11 constituted by the base portion 67 may be an upper portion and a front portion of the housing 11. The reading part cover 68 is supported so as to be openable and closable with respect to the base portion 67. The document feeding port 61, the reading transport part 62, the reading part 63, and the document discharge port 64 may be constituted by a member provided on one of the base portion 67 and the reading part cover 68, or a member provided separately on both. The reading transport path FR is configured as a space between the base portion 67 and the reading part cover 68. The base portion 67 may include a path portion 67a. The path portion 67a may constitute an end surface of the base portion 67 in the depth direction Y. The reading transport path FR may be located along the path portion 67a. The reading transport path FR extends between the document feeding port 61 and the document discharge port 64.

The reading part cover 68 has a cover shaft 69 that extends in the width direction X. The cover shaft 69 is located at a lower end portion of the reading part cover 68. The reading part cover 68 can be displaced to an open position and a closed position by rotating about an axis of the cover shaft 69 When the reading part cover 68 is at the closed position, the base portion 67 is covered by the reading part cover 68. When the reading part cover 68 is at the closed position, transport of the document 95 via the reading transport path FR by the reading transport part 62 and reading of the document 95 by the reading part 63 are enabled. When the reading part cover 68 is at the open position, the reading part cover 68 is separated from the base portion 67, and thus the reading transport path FR is opened. When a jam of the document 95 occurs in the scanner part 60, the user can resolve the jam by rotating the reading part cover 68 to the open position.

The reading transport path FR includes a first transport path FR1 that extends from the document feeding port 61 and a second transport path FR2 that extends between the first transport path FR1 and the document discharge port 64. The first transport path FR1 extends in the depth direction Y. The second transport path FR2 is inclined to be located further in the depth direction Y going further in the vertical direction Z.

Hereinafter, a transport direction of the document 95 is also referred to as a transport direction D2. The transport direction D2 is a direction along the reading transport path FR. The width direction X intersects the transport direction D2. The reading transport part 62 includes an upstream driving roller pair 71, a first driving roller pair 72, and a second driving roller pair 73. The first driving roller pair 72 is located downstream of the upstream driving roller pair 71 in the transport direction D2. The second driving roller pair 73 is located downstream of the first driving roller pair 72 in the transport direction D2.

The upstream driving roller pair 71 includes an upstream driving roller 74 and an upstream driven roller 75 facing each other. The first driving roller pair 72 includes a first driving roller 76 and a first driven roller 77 facing each other. The second driving roller pair 73 includes a second driving roller 78 and a second driven roller 79 facing each other. The upstream driving roller 74, the first driving roller 76 and the second driving roller 78 are provided on the base portion 67. The upstream driven roller 75, the first driven roller 77, and the second driven roller 79 are provided on the reading part cover 68. All rotating shafts of the upstream driving roller 74, the upstream driven roller 75, the first driving roller 76, the first driven roller 77, the second driving roller 78, and the second driven roller 79 extend in the width direction X.

The upstream driving roller 74, the first driving roller 76, and the second driving roller 78 are driven by a motor (not illustrated). When the document 95 passes through the reading transport path FR, each of the upstream driving roller pair 71, the first driving roller pair 72, and the second driving roller pair 73 rotates while the document 95 passing through the reading transport path FR is sandwiched therebetween. Thus, the document 95 is transported in the transport direction D2 in the reading transport path FR. The document 95 fed from the document feeding port 61 passes through the reading transport path FR and is then discharged from the document discharge port 64.

The document discharge port 64 corresponds to a space sandwiched between a discharge guide portion 88 and a wall portion 89 in the vertical direction Z. The discharge guide portion 88 is located in the vertical direction Z with respect to the second driving roller pair 73 in the base portion 67.

Reading Part

The reading part 63 reads information of the document 95. The reading part 63 may be provided between the upstream driving roller pair 71 and the first driving roller pair 72 in the transport direction D2. The reading part 63 may be provided on the reading part cover 68. When the reading part cover 68 is at the closed position, the reading part 63 may face the reading transport path FR.

The reading part 63 may include a plurality of contact image sensor modules 80. Hereinafter, the contact image sensor module 80 is also referred to as a CIS module 80. The CIS module 80 includes two light sources 81, a light receiving element 82, and a contact glass 83. The light source 81 emits light to the document 95. The light source 81 includes, for example, an LED. The light receiving element 82 receives reflected light from the document 95 during transportation. The light receiving element 82 includes, for example, a CMOS sensor. The light receiving element 82 has red, blue, and green color filters. The contact glass 83 has a transmission surface 84 that transmits light. The document 95 is transported while coming into contact with the transmission surface 84. The light source 81 irradiates the document 95 with white light through the contact glass 83. The CIS module 80 reads the reflected light from the document 95 that is received by the light receiving element 82.

The control of the light source 81 and the light receiving element 82 of the CIS module 80 may be performed by the control part 29 or by a dedicated control part such as a microprocessor provided in the CIS module 80. Due to the control of the light receiving element 82, color image data is generated based on reading results of the light receiving element 82.

Document Feeding Port

The document 95 is fed to the document feeding port 61. The document feeding port 61 may be formed on the upper surface 16a. The document feeding port 61 may extend in the width direction X. A dimension of the document feeding port 61 in the width direction X may be smaller than a dimension of the upper surface 16a in the width direction X. Both end portions of the document feeding port 61 in the width direction X are adjacent to the upper surface 16a. The document feeding port 61 may be located to be biased in the depth direction Y with respect to an intermediate portion of the upper surface 16a in the depth direction Y.

Cover Member

Figure 5:
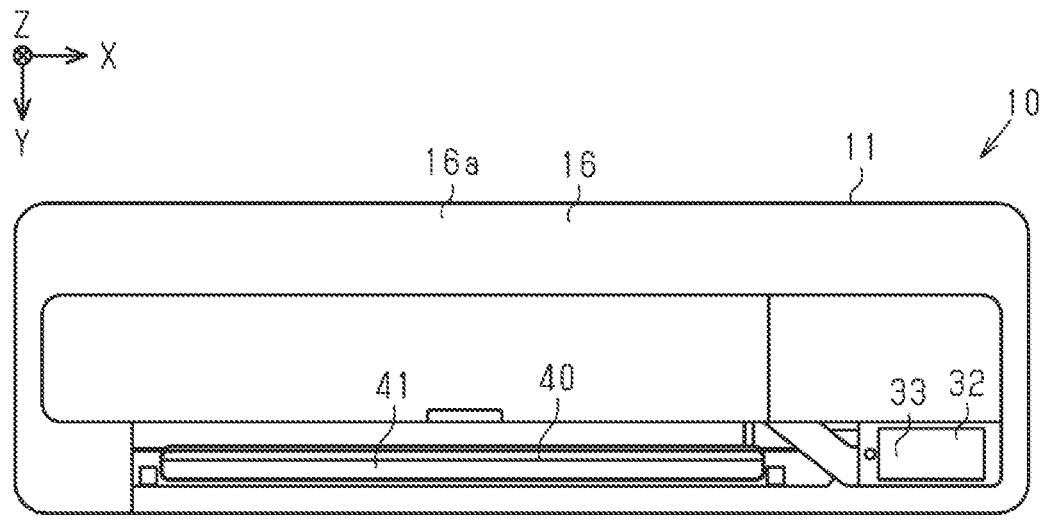
FIG. 5 is a top view illustrating a housing.
Figure 6:
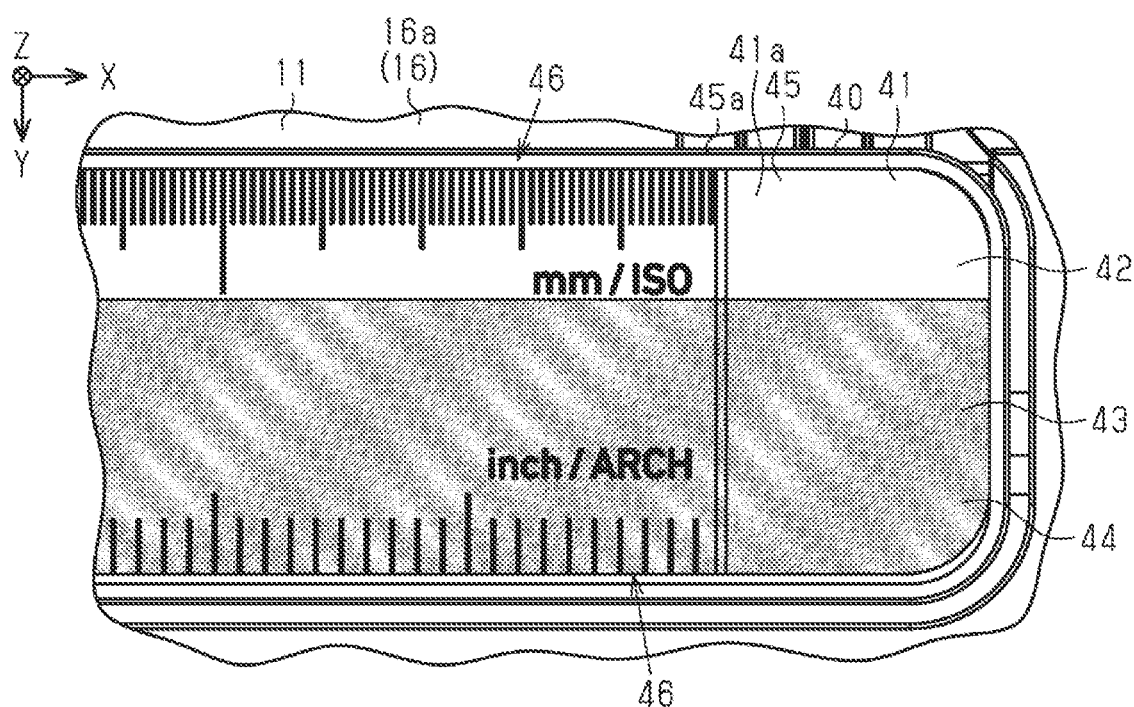
FIG. 6 is a top view illustrating an enlarged portion of a cover member.
Figure 7:
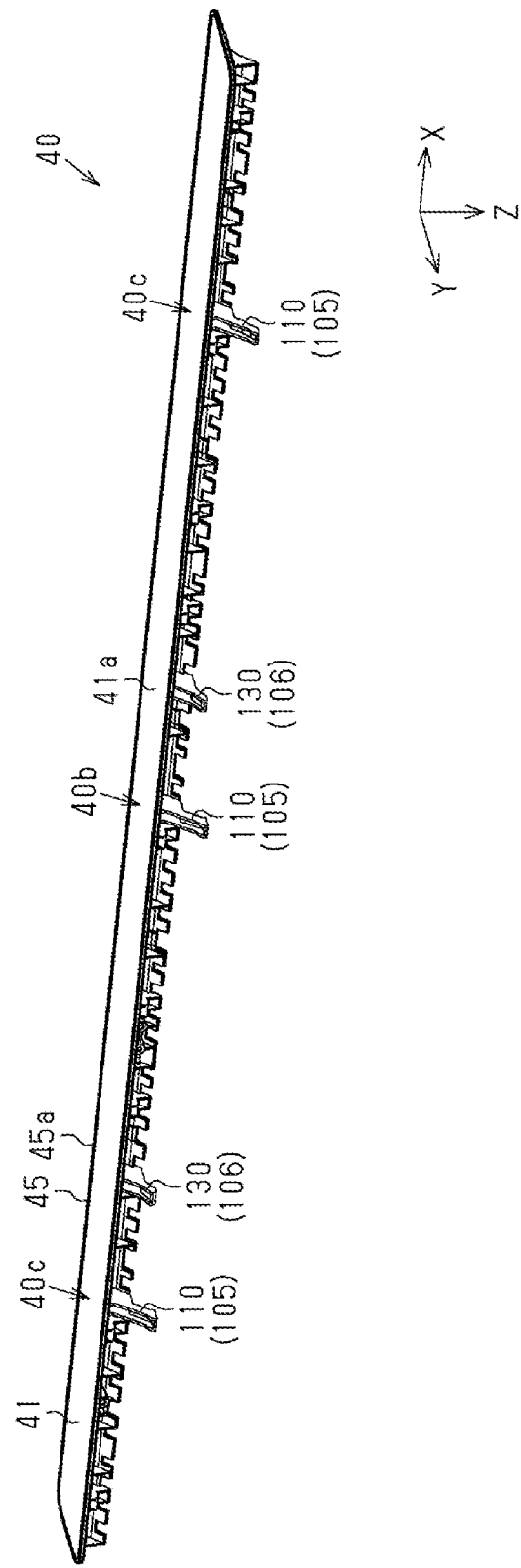
FIG. 7 is a perspective view illustrating the cover member.

As illustrated in FIGS. 5 to 7, the cover member 40 is disposed in the housing 11. The cover member 40 may include a flat plate-shaped cover main body 41. The cover main body 41 may have a size such that the document feeding port 61 can be closed from above. The cover main body 41 may extend in the width direction X. A dimension of the cover main body 41 in the width direction X may be smaller than a dimension of the upper surface 16*a* in the width direction X. Both end portions of the cover main body 41 in the width direction X are adjacent to the upper surface 16*a*. The cover main body 41 may be located to be biased in the depth direction Y with respect to the intermediate portion of the upper surface 16*a* of the upper wall 16 of the housing 11 in the depth direction Y. A main body upper surface 41*a* that is an upper surface of the cover main body 41 constitutes an upper surface of the cover member 40. A main body lower surface 41*b* (refer to FIG. 8) that is a lower surface of the cover main body 41 constitutes a lower surface of the cover member 40.

As illustrated in FIGS. 3 and 4, the cover member 40 has an opening and closing end portion 45 on the upstream side in the transport direction D2 of the document 95 fed from the document feeding port 61. The opening and closing end portion 45 is an end portion of the cover member 40 in a direction opposite to the depth direction Y. A portion of the cover main body 41 including an end portion in the direction opposite to the depth direction Y corresponds to the opening and closing end portion 45. A portion of the body lower surface 41*b* corresponds to a bottom surface 45*b* of the opening and closing end portion 45. The cover member 40 is displaced to an open position P1 at which the document feeding port 61 is open and a closed position P2 at which the document feeding port 61 is closed. The cover member 40 is displaced to the open position P1 and the closed position P2 by rotating about a rotating shaft 40*a*.

When the cover member 40 is at the closed position P2, the main body upper surface 41*a* of the cover member 40 may be at the same height as the upper surface 16*a* of the housing 11. The same height includes a case in which the main body upper surface 41*a* is slightly higher than the upper surface 16*a* of the housing 11, in addition to the case in which the main body upper surface 41*a* and the upper surface 16*a* of the housing 11 are completely at the same height.

As illustrated in FIG. 6, the main body upper surface 41*a* that is the upper surface of the cover member 40 includes a first region 42 and a second region 43 disposed side by side in the transport direction D2. The main body upper surface 41*a* may be divided into two portions in the depth direction Y by the first region 42 and the second region 43. The first region 42 may be a region located at a tip end 45*a* of the opening and closing end portion 45 further than the second region 43. A boundary position between the first region 42 and the second region 43 may be a position shifted in the direction opposite to the depth direction Y with respect to the intermediate position in the depth direction Y of the main body upper surface 41*a*. When the main body upper surface 41*a* is seen from above, an area of the second region 43 occupying the main body upper surface 41*a* may be larger than an area of the first region 42 occupying the main body upper surface 41*a*. A portion of the second region 43 located at a position closer to a boundary with the first region 42 may be located at the opening and closing end portion 45. The second region 43 may be aligned with the document feeding port 61 in the vertical direction Z.

The cover main body 41 may be formed of a material having light transmitting properties. The material of the cover main body 41 may include, for example, plastic. A sheet 44 having light shielding properties may be attached to the second region 43. The sheet 44 may not be attached to the first region 42. Thus, the first region 42 may have light transmitting properties. The second region 43 may have light shielding properties.

The main body upper surface 41*a* may have a scale 46 in the width direction X. The scale 46 is formed in both end portions of the main body upper surface 41*a* in the depth direction Y. The scale 46 may be formed in both the first region 42 and the second region 43, or may be formed in any one of the first regions 42 and the second regions 43.

As illustrated in FIG. 3, when the cover member 40 is at the closed position P2, a portion facing the bottom surface 45*b* of the opening and closing end portion 45 is referred to as a facing portion 11*b*. The facing portion 11*b* may be a part of the housing 11. In other words, the housing 11 has the facing portion 11*b*. The bottom surface 45*b* of the opening and closing end portion 45 and the facing portion 11*b* may face each other in the vertical direction Z. The facing portion 11*b* may be a part of the base portion 67. The facing portion 11*b* may be located at a portion of the base portion 67 that forms the first transport path FR1.

When the cover member 40 is at the closed position P2, a gap 11*c* through which the document 95 can pass is formed between a part or the whole of the bottom surface 45*b* of the opening and closing end portion 45 and the facing portion 11*b*. The gap 11*c* may be a space formed by the bottom surface 45*b* and the facing portion 11*b*. A dimension of the gap 11*c* in the vertical direction Z may be greater than a thickness of the document 95. A dimension of the gap 11*c* in the width direction X may be greater than a dimension of the document 95 in the width direction X.

When the cover member 40 is at the closed position P2, the portion facing the tip end 45*a* of the opening and closing end portion 45 is referred to as a tip end facing portion 11*d*. The tip end facing portion 11*d* is a portion of the housing 11 that faces the opening and closing end portion 45 in the depth direction Y when the cover member 40 is at the closed position P2. The tip end facing portion 11*d* may be a surface that extends to be orthogonal to the depth direction Y. When the cover member 40 is at the closed position P2, the opening and closing end portion 45 and the tip end facing portion 11*d* may be separated from each other. A surface of the housing 11 that extends between the facing portion 11*b* and the tip end facing portion 11*d* is referred to as an intermediate surface 11*e*. The intermediate surface 11*e* is located at a position shifted further in the vertical direction Z as it goes from the facing portion 11*b* toward the tip end facing portion 11*d* in the depth direction Y. When the cover member 40 is at the closed position P2, the intermediate surface 11*e* may not face the opening and closing end portion 45.

Restriction Mechanism

As illustrated in FIG. 7, the reading apparatus 10 includes a restriction mechanism 105 that restricts displacement of the cover member 40. The restriction mechanism 105 may include a first protruding portion 110. The first protruding portion 110 is a part of the cover member 40. The first protruding portion 110 may extend from the cover main body 41 in the vertical direction Z. The first protruding portion 110 may extend from between an end portion of the cover member 40 in the depth direction Y and the opening and closing end portion 45. The first protruding portion 110 may have a shape that is shifted in the depth direction Y as it goes away from the cover main body 41 in the vertical direction Z. A plurality of first protruding portions 110 are located apart from each other in the width direction X. The plurality of first protruding portions 110 are provided at least at a central portion 40*b* of the cover member 40 in the width direction X and at spaced portions 40*c* thereof located apart from the central portion 40*b* in the width direction X and located on both sides of the central portion 40*b* in the width direction X. The cover member 40 of the embodiment has three first protruding portions 110. The three first protruding portions 110 are located in each of the central portion 40*b* and the spaced portions 40*c*.

Figure 8:
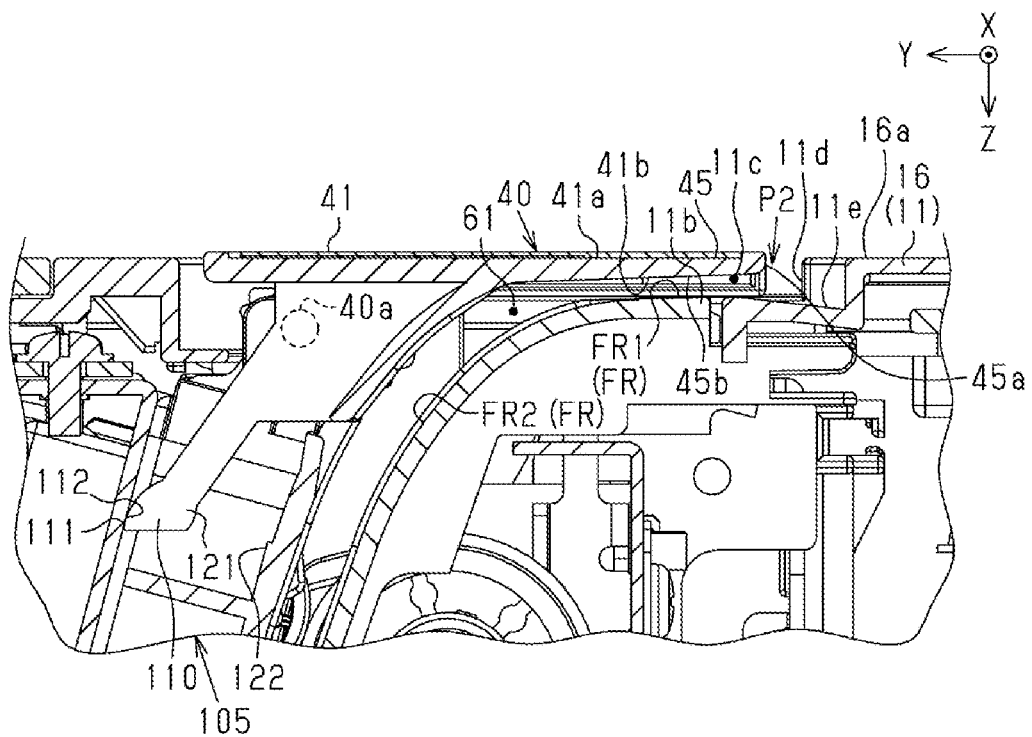
FIG. 8 is a cross-sectional view illustrating the cover member at a closed position.

As illustrated in FIG. 8, the first protruding portion 110 may have a first contact portion 111. That is, the restriction mechanism 105 may have the first contact portion 111. The first contact portion 111 is located on the cover member 40. Similar to the first protruding portions 110, a plurality of first contact portions 111 are located apart from each other in the width direction X. A plurality of restriction mechanisms 105 are located apart from each other in the width direction X. The restriction mechanisms 105 are provided at the central portion 40*b* and the spaced portions 40*c* of the cover member 40. Since the cover member 40 of the embodiment has the three first protruding portions 110, the cover member 40 has the first contact portions 111 at three locations separated from each other in the width direction X. The reading apparatus 10 includes the restriction mechanisms 105 at three locations. The first contact portion 111 is a portion located in the depth direction Y in an end portion of the first protruding portion 110 in the vertical direction Z. A distance between the rotating shaft 40*a* and the first contact portion 111 in the cover member 40 may be shorter than a distance between the rotating shaft 40*a* and the opening and closing end portion 45.

Each of the restriction mechanisms 105 may have a first contacted portion 112. The first contacted portion 112 is located in the housing 11. A plurality of first contacted portions 112 are located apart from each other in the width direction X. The housing 11 includes the first contacted portions 112 at three locations separated from each other in the width direction X.

When the cover member 40 is at the closed position P2, the first contact portions 111 and the first contacted portions 112 are in contact with each other. When the cover member 40 is displaced from a state in which the cover member 40 is not located at the closed position P2 to the closed position P2, the first protruding portions 110 are displaced to be closer to the first contacted portions 112 in the depth direction Y. When the cover member 40 is displaced to the closed position P2, the first contact portions 111 come into contact with the first contacted portions 112. When the cover member 40 is at the closed position P2, the restriction mechanism 105 restricts the displacement of the cover member 40 in a closing direction from the closed position P2 due to the contact between the first contact portion 111 and the first contacted portion 112. Thus, when the cover member 40 is at the closed position P2, the restriction mechanism 105 restricts the displacement of the cover member 40 in the closing direction in a state in which the gap 11*c* is formed between a part or the whole of the bottom surface 45*b* of the opening and closing end portion 45 and the facing portion 11*b*.

Figure 9:
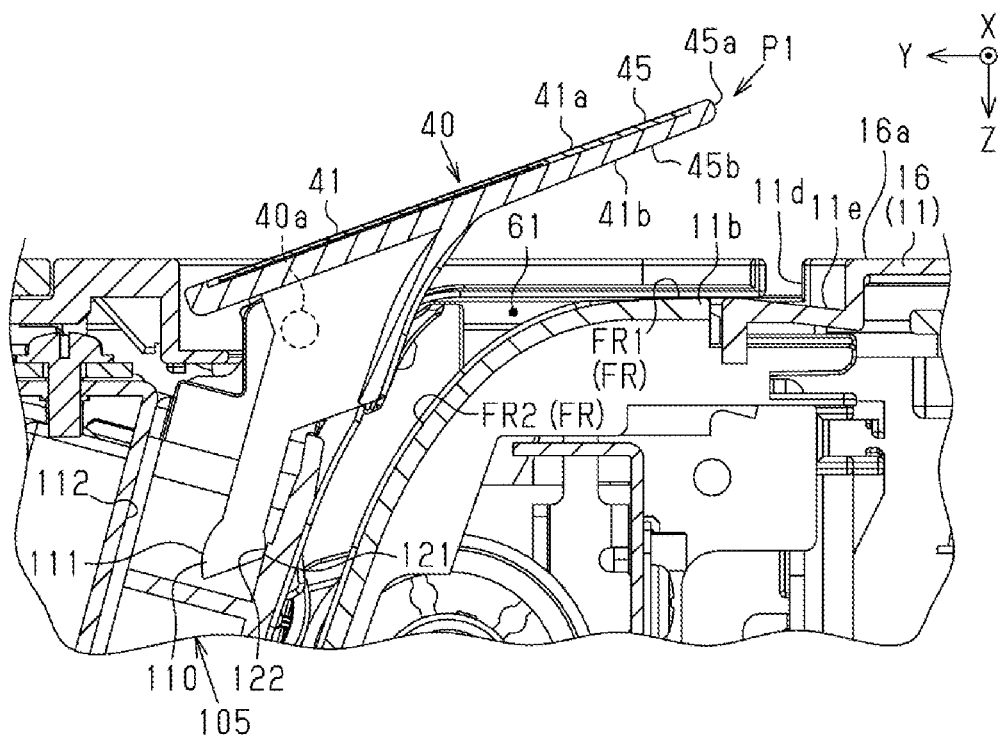
FIG. 9 is a cross-sectional view illustrating the cover member at an open position.

As illustrated in FIG. 9, each of the first protruding portions 110 may have a second contact portion 121. In other words, the restriction mechanisms 105 may have the second contact portion 121. The second contact portion 121 is located on the cover member 40. A plurality of second contact portions 121 are located apart from each other in the width direction X. Since the cover member 40 of the embodiment has three first protruding portions 110, the cover member 40 has the second contact portions 121 at three locations separated from each other in the width direction X. The second contact portion 121 is a portion located in the direction opposite to the depth direction Y in the end portion of the first protruding portions 110 in the vertical direction Z.

Each of the restriction mechanisms 105 may have a second contacted portion 122. The second contacted portion 122 is located in the housing 11. A plurality of second contacted portions 122 are located apart from each other in the width direction X. The housing 11 includes the second contacted portions 122 at three locations separated from each other in the width direction X.

When the cover member 40 is at the open position P1, the second contact portions 121 and the second contacted portions 122 are in contact with each other. When the cover member 40 is displaced from a state in which the cover member 40 is not located at the open position P1 to the open position P1, the first protruding portions 110 are displaced to be closer to the second contacted portions 122. When the cover member 40 is displaced to the open position P1, the second contact portions 121 come into contact with the second contacted portions 122. When the cover member 40 is at the open position P1, the restriction mechanism 105 restricts the displacement of the cover member 40 from the open position P1 in an opening direction by the contact between the second contact portions 121 and the second contacted portions 122.

Maintaining Mechanism

As illustrated in FIG. 7, the reading apparatus 10 may include a maintaining mechanism 106 that maintains the cover member 40. The maintaining mechanism 106 may include a second protruding portion 130. The second protruding portion 130 is a part of the cover member 40. The second protruding portion 130 may extend from the cover main body 41 in the vertical direction Z. The second protruding portion 130 may extend from between the end portion of the cover member 40 in the depth direction Y and the opening and closing end portion 45. The second protruding portion 130 may have a shape that is shifted in the depth direction Y as it goes away from the cover main body 41 in the vertical direction Z. The second protruding portion 130 may be a snap-fit. A plurality of second protruding portions 130 may be located apart from each other in the width direction X. In the cover members 40, each of the second protruding portions 130 is provided at a position between the plurality of first protruding portions 110 in the width direction X. The cover member 40 of the embodiment has two second protruding portions 130. The second protruding portions 130 are located at a position shifted in the width direction X from the first protruding portion 110 located at the central portion 40*b* and a position shifted in a direction opposite to the width direction X from the first protruding portion 110 located at the central portion 40*b*.

Figure 10:
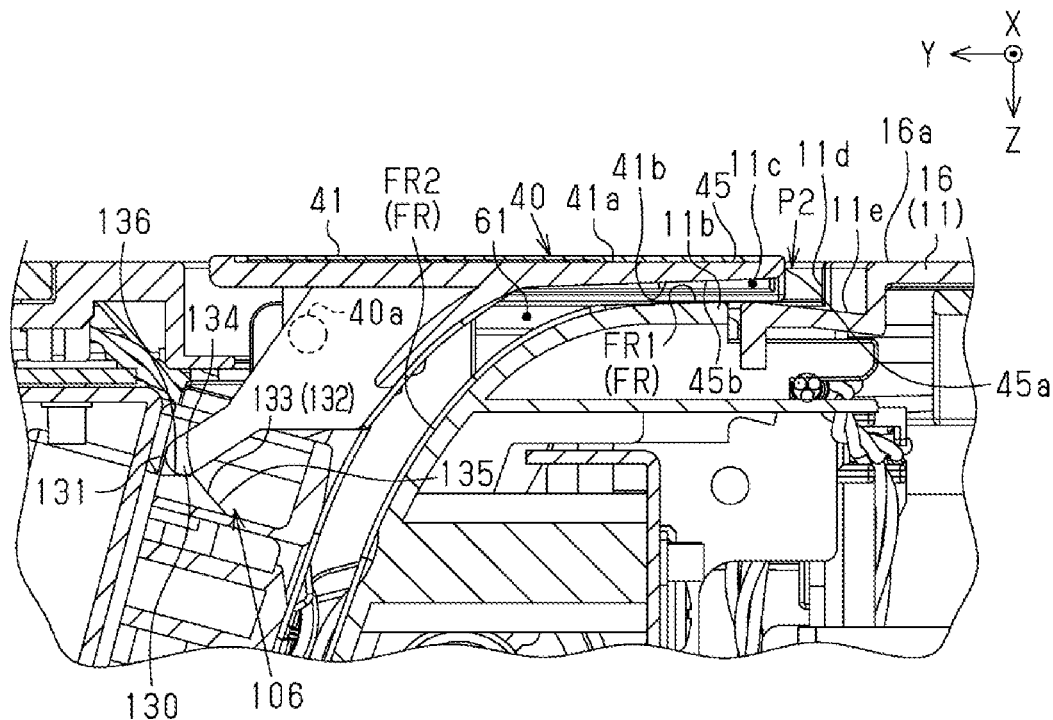
FIG. 10 is a cross-sectional view illustrating the cover member at the closed position.

As illustrated in FIG. 10, each of the second protruding portions 130 may have a sliding portion 131. That is, the maintaining mechanism 106 may have the sliding portion 131. The sliding portion 131 is located on the cover member 40. Similar to the second protruding portion 130, a plurality of sliding portions 131 are located apart from each other in the width direction X. A plurality of maintaining mechanisms 106 are located apart from each other in the width direction X. In the cover member 40, each of the maintaining mechanisms 106 is provided at a position between the plurality of restriction mechanisms 105 in the width direction X. Since the cover member 40 of the embodiment includes the two second protruding portions 130, the sliding portions 131 are located at two locations separated from each other in the width direction X. The reading apparatus 10 includes the maintaining mechanisms 106 at two locations. The sliding portions 131 are end portions of the second protruding portions 130 in the vertical direction Z.

Each of the maintaining mechanisms 106 may have a sliding surface 132. The sliding surface 132 is located on the housing 11. A plurality of sliding surfaces 132 are located apart from each other in the width direction X. The housing 11 includes the sliding surfaces 132 at two locations separated from each other in the width direction X.

Each of the sliding surfaces 132 has a sliding region 133. The sliding portion 131 is slidable in the sliding region 133. The sliding region 133 includes a central region 134, a first sliding region 135, and a second sliding region 136 that is located opposite to the first sliding region 135 with the central region 134 interposed therebetween. The sliding surface 132 is a convex surface in which the central region 134 protrudes toward the cover member 40. The central region 134 may be located between the first sliding region 135 and the second sliding region 136 in the depth direction Y. In the sliding region 133, the second sliding region 136 may be a region located in the depth direction Y with respect to the central region 134. In the sliding region 133, the first sliding region 135 may be a region located in a direction opposite to the depth direction Y with respect to the central region 134. The central region 134 may be located above the first sliding region 135 and the second sliding region 136.

When the cover member 40 is at the closed position P2, the sliding portion 131 is located in the second sliding region 136. When the cover member 40 is displaced from the open position P1 to the closed position P2, the sliding portion 131 is displaced while a sliding position thereof in the sliding region 133 is changed in the order of the first sliding region 135, the central region 134, and the second sliding region 136. When the sliding portion 131 slides in the central region 134, the second protruding portion 130 may be bent over the central region 134. The maintaining mechanism 106 maintains the cover member 40 at the closed position P2 when the sliding portion 131 is located at the second sliding region 136. The maintaining mechanism 106 maintains the cover member 40 at the closed position P2 when the cover member 40 is at the closed position P2. When the cover member 40 is at the closed position P2, the maintaining mechanism 106 suppresses the displacement of the cover member 40 to the open position P1 to maintain the cover member 40 at the closed position P2.

Figure 11:
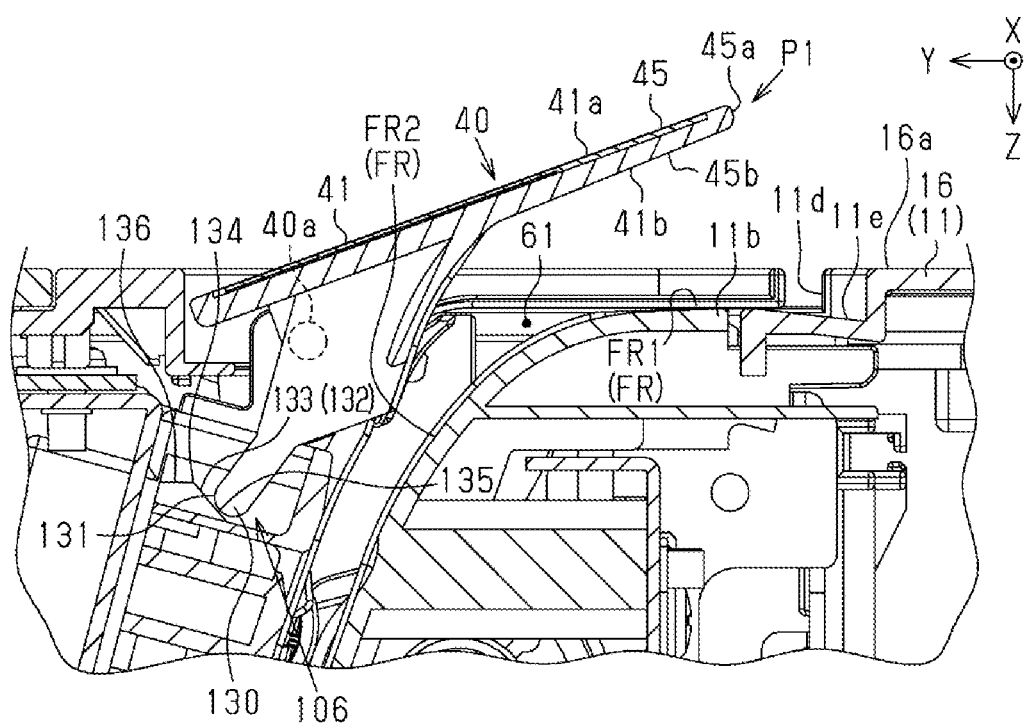
FIG. 11 is a cross-sectional view illustrating the cover member at the open position.

As illustrated in FIG. 11, when the cover member 40 is at the open position P1, the sliding portion 131 is located in the first sliding region 135. When the cover member 40 is displaced from the closed position P2 to the open position P1, the sliding portion 131 is displaced while the sliding position thereof in the sliding region 133 is changed in the order of the second sliding region 136, the central region 134, and the first sliding region 135. When the sliding portion 131 slides in the central region 134, the second protruding portion 130 may be bent over the central region 134. The maintaining mechanism 106 maintains the cover member 40 at the open position P1 when the sliding portion 131 is located in the first sliding region 135. The maintaining mechanism 106 maintains the cover member 40 at the open position P1 when the cover member 40 is at the open position P1. When the cover member 40 is at the open position P1, the maintaining mechanism 106 curbs the displacement of the cover member 40 to the closed position P2 to maintain the cover member 40 at the open position P1.

Drive Source and Power Transmission Mechanism

As illustrated in FIG. 3, the drive source 47 displaces the cover member 40 to the open position P1 and the closed position P2. The control part 29 may be able to displace the cover member 40 to the open position P1 and the closed position P2 by the drive source 47. The drive source 47 may be a motor. The drive source 47 performs the displacement of the cover member 40 by driving the power transmission mechanism 48. The power transmission mechanism 48 includes a drive gear 49, a first gear 51 to a seventh gear 57, and a cover transmission part 58. The drive gear 49 is fixed to a drive shaft 47a of the drive source 47. The first gear 51 and the second gear 52 rotate integrally with each other by being fixed to a common gear shaft 51a. The cover transmission part 58 includes a tooth portion 58a. The tooth portion 58a is engaged with the seventh gear 57, and thus power can be transmitted from the seventh gear 57 to the cover transmission part 58. The cover transmission part 58 may be fixed to the cover member 40. The cover member 40 is displaced with the displacement of the cover transmission part 58.

The drive source 47 may be switched between forward rotation driving and reverse rotation driving by the control part 29. When the drive source 47 is driven forward, the power of the drive source 47 is transmitted in the order of the drive gear 49, the first gear 51, the second gear 52, the third gear 53, the fourth gear 54, the fifth gear 55, the sixth gear 56, the seventh gear 57, and the cover transmission part 58. With the transmission of the power from the seventh gear 57, the cover transmission part 58 displaces the tooth portion 58a while the tooth portion 58a is engaged with the seventh gear 57. With the displacement of the cover transmission part 58, the cover member 40 is displaced to the closed position P2.

As illustrated in FIG. 4, when the drive source 47 is driven reversely, the power of the drive source 47 is transmitted in the order of the drive gear 49, the first gear 51, the second gear 52, the third gear 53, the fourth gear 54, the fifth gear 55, the sixth gear 56, the seventh gear 57, and the cover transmission part 58. A rotation direction of each of the drive gear 49 and the first gear 51 to the seventh gear 57 is a direction opposite to a direction when the drive source 47 is driven forward. With the transmission of the power from the seventh gear 57, the cover transmission part 58 displaces the tooth portion 58a while the tooth portion 58a is engaged with the seventh gear 57. With the displacement of the cover transmission part 58, the cover member 40 is displaced to the open position P1.

When the cover member 40 is displaced to the open position P1 by the drive source 47, the control part 29 may notify that the cover member 40 has been changed to the open position P1 by the display part 33 or a buzzer as a notification part. The notification allows the user to know that the cover member 40 has been displaced to the open position P1.

When the cover member 40 is displaced under a situation in which the power is transmitted from the drive source 47 to the power transmission mechanism 48 such as a case in which the user manually displaces the cover member 40, the power is transmitted from the cover transmission part 58 to the seventh gear 57 according to the displacement of the cover member 40. The power is transmitted in the order of the seventh gear 57, the sixth gear 56, the fifth gear 55, the fourth gear 54, the third gear 53, the second gear 52, the first gear 51, and the drive gear 49. The drive shaft 47a may be rotatable with the power transmitted to the drive gear 49.

Control Part

Figure 12:
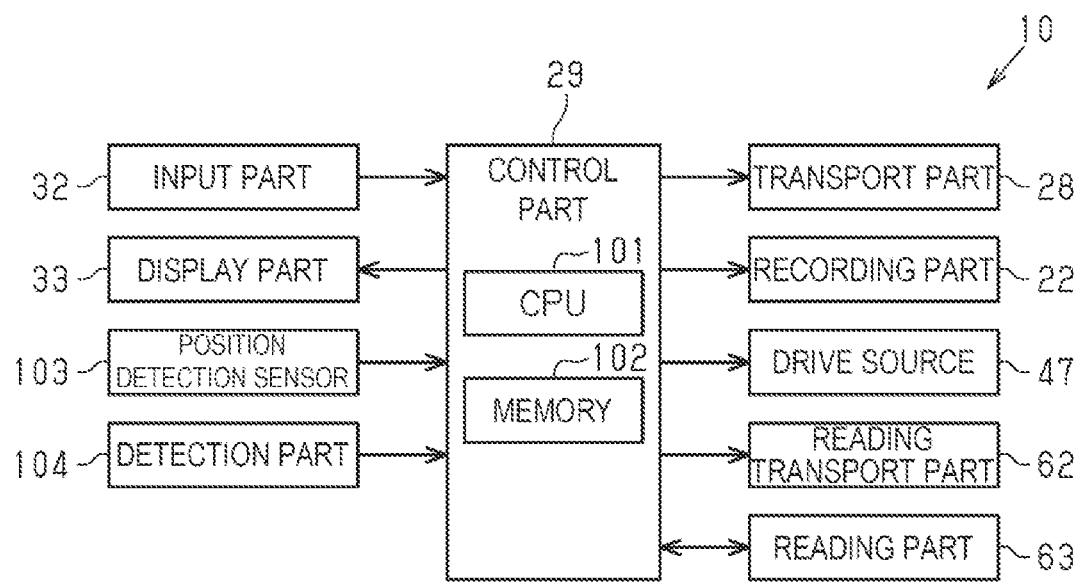
FIG. 12 is a block diagram illustrating an electrical configuration of the reading apparatus.

As illustrated in FIG. 12, the control part 29 controls various operations performed by the reading apparatus 10. The control part 29 can be configured as a circuit including α: one or more processors that perform various processing according to a computer program, β: one or more dedicated hardware circuits that perform at least some of the various processing, or γ: a combination thereof. The hardware circuit is, for example, an application-specific integrated circuit. The processor includes a CPU 101 and a memory 102 such as RAM and ROM, and the memory 102 stores a program code or a command configured to cause the CPU 101 to perform the processing. The memory 102, that is, a computer readable medium includes all kinds of readable media accessible by a general purpose or dedicated computer.

The control part 29 may be electrically connected to the display part 33. The control part 29 may be electrically connected to the input part 32. When an input is performed on the input part 32, a signal is output from the input part 32 to the control part 29. When a predetermined input is performed on the input part 32, a copy request signal is output from the input part 32 to the control part 29. When the copy request signal is received, the control part 29 operates the reading transport part 62 and reads the document 95 with the reading part 63 to generate image data. The control part 29 operates the recording part 22 and the transport part 28 to print and replicate an image based on the generated image data on the medium 20. The control part 29 may control movement and stop of the recording head 25 by controlling the drive of the carriage motor 23a in the recording part 22 based on the input to the input part 32 by the user.

The control part 29 may be electrically connected to a detection part 104. The detection part 104 detects that there is a target object at a position facing an outer surface of the housing 11. The detection part 104 is, for example, a human sensor. The outer surface of the housing 11 may be, for example, the upper surface 16a of the upper wall 16 or a front surface of the front wall 12. When the user is located at a position facing the outer surface of the housing 11, the detection part 104 detects that there is the target object.

The control part 29 may be electrically connected to a position detection sensor 103 as a position detection mechanism for detecting a position of the cover member 40. The position detection sensor 103 in the embodiment corresponds to the position detection mechanism for detecting the position of the cover member 40. When the cover member 40 is at the open position P1 and the cover member 40 is at the closed position P2, a signal is output from the position detection sensor 103 to the control part 29. The position detection sensor 103 may be provided inside the housing 11, or may be provided outside the housing 11. That is, the reading apparatus 10 may include the position detection sensor 103. The position detection sensor 103 may be provided at each of a position at which the cover member 40 located at the open position P1 can be detected, and a position at which the cover member 40 located at the closed position P2 can be detected.

The control part 29 may displace the position of the cover member 40 by the drive source 47 according to the position of the cover member 40. The control part 29 may perform predetermined processing when the result detected by the position detection sensor 103 indicates that the cover member 40 has been displaced. The control part 29 may perform first processing, second processing, third processing, and fourth processing which will be described below.

Next, a control method of the reading apparatus 10 will be described with reference to flowcharts illustrated in FIGS. 13 to 16. Here, the order of steps in each of the control methods can be arbitrarily changed without departing from the purpose of each of the control methods.

First Processing

The routine of the first processing will be described with reference to FIG. 13. The first processing may be performed periodically while the reading apparatus 10 is powered on.

Figure 13:
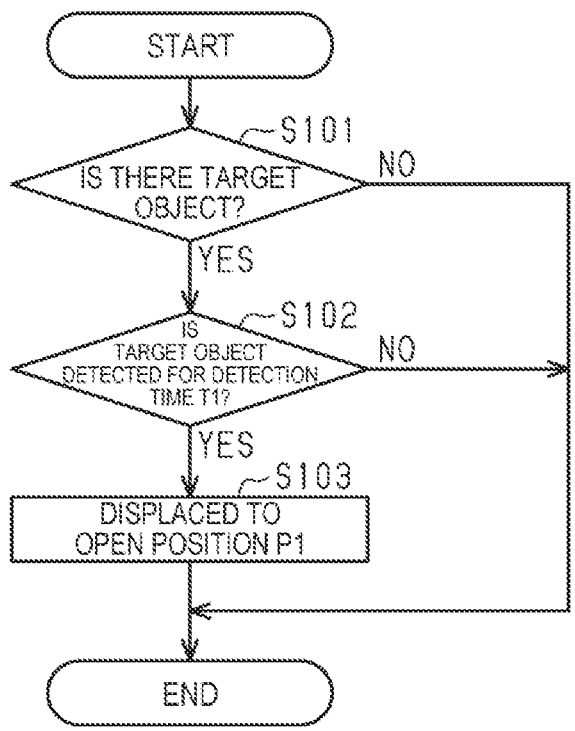
FIG. 13 is a flowchart illustrating a first processing routine.

As illustrated in FIG. 13, in Step S101, the control part 29 determines whether there is a target object at a position facing the outer surface of the housing 11. When the detection part 104 does not detect that there is a target object at a position facing the outer surface of the housing 11, the control part 29 determines that there is no target object at a position facing the outer surface of the housing 11, and thus Step S101 becomes NO. The control part 29 ends the routine of the first processing. When the detection part 104 detects that there is a target object at a position facing the outer surface of the housing 11, the control part 29 determines that there is the target object at a position facing the outer surface of the housing 11, and thus Step S101 becomes YES. The control part 29 shifts the processing to Step S102.

In Step S102, the control part 29 determines whether the detection part 104 has detected that there is a target object at a position facing the outer surface of the housing 11 for a predetermined detection time T1. The control part 29 measures time from a timing at which the detection part 104 detects that there is a target object at a position facing the outer surface of the housing 11. In Step S102, the control part 29 may determine whether the detection by the detection part 104 has continued for the detection time T1 or more based on the measured time. The detection time T1 may be a preset setting value. The detection time T1 may be a time during which it can be assumed that the user is at a position facing the outer surface of the housing 11 in order to operate the reading apparatus 10. When the time during which the detection part 104 detects that there is the target object at a position facing the outer surface of the housing 11 is shorter than the detection time T1, Step S102 becomes NO. The control part 29 ends the routine of the first processing. When the detection part 104 detects that there is a target object at a position facing the outer surface of the housing 11 for the detection time T1, Step S102 becomes YES. The control part 29 shifts the processing to Step S103. In Step S103, the control part 29 displaces the cover member 40 to the open position P1 by the drive source 47. The control part 29 ends the routine of the first processing.

As illustrated in FIGS. 3, 4, and 12, in the first processing, the control part 29 causes the drive source 47 to displace the cover member 40 to the open position P1 based on the fact that the detection part 104 detects that there is a target object at a position facing the outer surface of the housing 11. When the detection part 104 does not detect that there is a target object at a position facing the outer surface of the housing 11, the cover member 40 does not displace. At this time, when the cover member 40 is at the closed position P2, the cover member 40 remains at the closed position P2 and is not displaced.

In the first processing, the control part 29 causes the drive source 47 to displace the cover member 40 to the open position P1 when the detection part 104 detects that there is a target object at a position facing the outer surface of the housing 11 for the predetermined detection time T1. Even though the detection part 104 detects that there is a target object at a position facing the outer surface of the housing 11, when the detection by the detection part 104 continues for a time less than the detection time T1, the cover member 40 is not displaced. At this time, when the cover member 40 is at the closed position P2, the cover member 40 remains at the closed position P2 and is not displaced.

Second Processing

The routine of the second processing will be described with reference to FIG. 14. The second processing may be performed periodically while the reading apparatus 10 is powered on.

Figure 14:
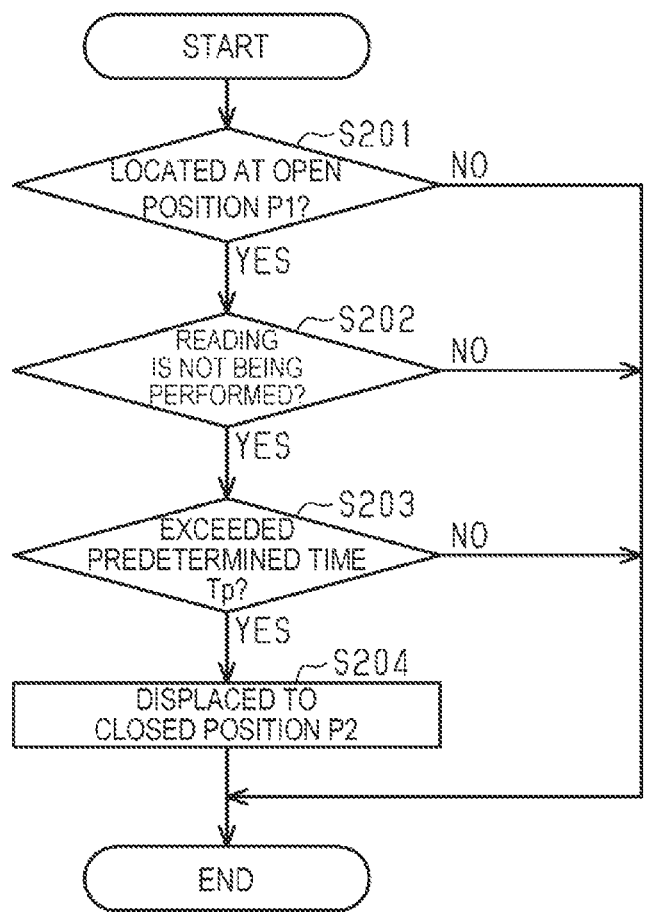
FIG. 14 is a flowchart illustrating a second processing routine.

As illustrated in FIG. 14, in Step S201, the control part 29 determines whether or not the cover member 40 is at the open position P1. When the position detection sensor 103 detects that the cover member 40 is at the open position P1, the control part 29 determines that the cover member 40 is at the open position P1. When the position detection sensor 103 detects that the cover member 40 is at the closed position P2, and detects that the cover member 40 is neither at the open position P1 nor at the closed position P2, the control part 29 determines that the cover member 40 is not at the open position P1. When the control part 29 determines that the cover member 40 is not at the open position P1, Step S201 becomes NO. The control part 29 ends the routine of the second processing. When the control part 29 determines that the cover member 40 is at the open position P1, Step S201 becomes YES. The control part 29 shifts the processing to Step S202.

In Step S202, the control part 29 determines whether the reading of the document 95 by the reading part 63 is not performed. When the control part 29 reads the document 95 with the reading part 63, the control part 29 considers that the reading part 63 is reading the document 95, and determines that reading by the reading part 63 is being performed. When the control part 29 does not cause the reading part 63 to read the document 95, the control part 29 considers that the reading part 63 is not reading the document 95, and determines that the reading of the reading part 63 is not performed. When the control part 29 determines that the reading of the reading part 63 is being performed, Step S202 becomes NO. The control part 29 ends the routine of the second processing. When the control part 29 determines that the reading by the reading part 63 is not performed, the processing proceeds to Step S203.

In Step S203, the control part 29 determines whether or not a period of time in which reading by the reading part 63 is not performed exceeds a predetermined time Tp. The control part 29 measures time from a timing when the control part 29 determines that reading by the reading part 63 is not performed. Based on the measured time, the control part 29 may determine in Step S203 whether or not a state in which reading by the reading part 63 is not performed has continued beyond the predetermined time Tp. The predetermined time Tp may be a preset setting value. The predetermined time Tp may be a time during which it can be determined that there is a risk of foreign matter entering the housing 11 from the document feeding port 61 when reading by the reading part 63 is not performed and a state in which the cover member 40 is at the open position P1 continues beyond the predetermined time Tp. When the control part 29 determines that the time during which the reading by the reading part 63 is not performed does not exceed the predetermined time Tp, Step S203 becomes NO. The control part 29 ends the routine of the second processing. When the control part 29 determines that the time during which the reading by the reading part 63 is not performed exceeds the predetermined time Tp, Step S203 becomes YES. The control part 29 shifts the processing to Step S204. In Step S204, the control part 29 displaces the cover member 40 to the closed position P2 by the drive source 47. The control part 29 ends the routine of the second processing.

As illustrated in FIGS. 3, 4, and 12, in the second processing, the control part 29 performs control as follows.

In other words, when the time during which the reading by the reading part 63 is not performed exceeds the predetermined time Tp, and the position detection sensor 103 detects that the cover member 40 is at the open position P1, the control part 29 causes the drive source 47 to displace the cover member 40 to the closed position P2. Specifically, in the second processing, when the cover member 40 is at the open position P1, and the state in which the reading by the reading part 63 is not performed exceeds the predetermined time Tp, the control part 29 causes the drive source 47 to displace the cover member 40 to the closed position P2. Thus, when the cover member 40 is at the open position P1 due to the user forgetting to close the cover member 40 or the like even though the reading by the reading part 63 is not performed, the cover member 40 can be displaced to the closed position P2.

Third Processing

The routine of the third processing will be described with reference to FIG. 15. The third processing may be performed periodically while the reading apparatus 10 is powered on.

Figure 15:
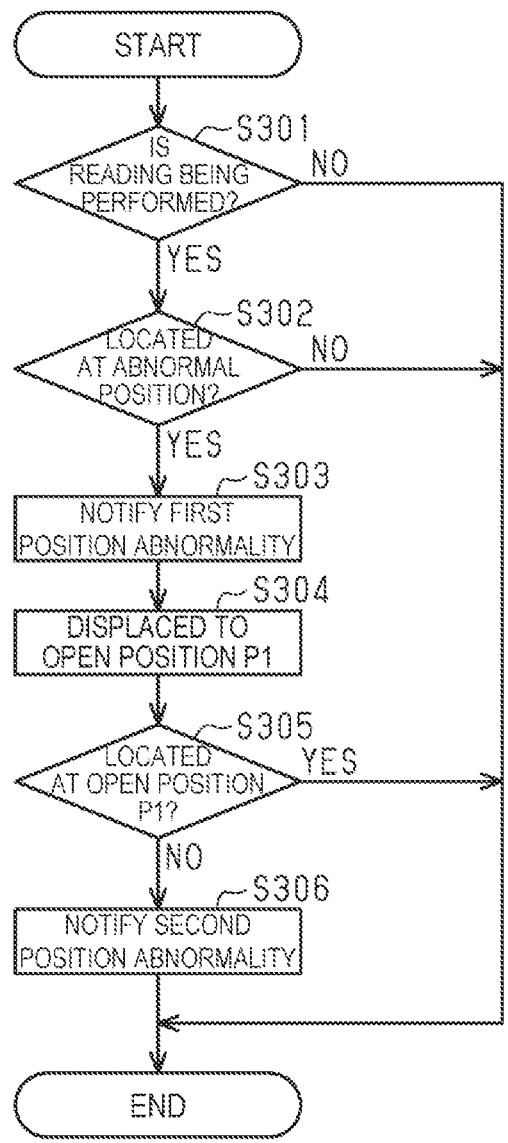
FIG. 15 is a flowchart illustrating a third processing routine.

As illustrated in FIG. 15, in Step S301, the control part 29 determines whether the reading part 63 is performing the reading. When the control part 29 determines that the reading part 63 is not performing the reading, Step S301 becomes NO. The control part 29 ends the routine of the third processing. When the control part 29 determines that the reading part 63 is performing the reading, Step S301 becomes YES. The control part 29 shifts the processing to Step S302.

In Step S302, the control part 29 determines whether the cover member 40 is at an abnormal position. The abnormal position in Step S302 is a position of the cover member 40 between the open position P1 and the closed position P2. In Step S302, when the position detection sensor 103 detects that the cover member 40 is displaced to a position between the open position P1 and the closed position P2, the control part 29 may determine that the cover member 40 is at the abnormal position. In Step S302, when the position detection sensor 103 detects that the cover member 40 is at either the open position P1 or the closed position P2, the control part 29 may determine that the cover member 40 is not at the abnormal position. When the control part 29 determines that the cover member 40 is not at the abnormal position, Step S302 becomes NO. The control part 29 ends the routine of the third processing. When the control part 29 determines that the cover member 40 is at the abnormal position, Step S302 becomes YES. The control part 29 shifts the processing to Step S303.

In Step S303, the control part 29 notifies a first position abnormality. In Step S303, the control part 29 causes the display part 33 as a notification part to perform notification. The control part 29 may cause the display part 33 to perform the notification, for example, by causing the display part 33 to display an error message. The error message may be the same as or different from an error message notified in other processing. The control part 29 shifts the processing to Step S304. In Step S304, the control part 29 causes the drive source 47 to displace the position of the cover member 40 to the open position P1. The processing in Step S304 corresponds to open drive processing. The control part 29 shifts the processing to Step S305.

In Step S305, the control part 29 determines whether or not the cover member 40 is at the open position P1. When the control part 29 determines that the cover member 40 is at the open position P1, Step S305 becomes YES. The control part 29 ends the routine of the third processing. When the control part 29 determines that the cover member 40 is not at the open position P1, Step S305 becomes NO. The control part 29 shifts the processing to Step S306.

In Step S306, the control part 29 notifies a second position abnormality. In Step S306, the control part 29 causes the display part 33 as a notification part to perform notification. The control part 29 may cause the display part 33 to perform notification, for example, by causing the display part 33 to display an error message. The error message may be the same as or different from an error message notified in other processing. The control part 29 ends the routine of the third processing after the notification of the second position abnormality in Step S306 is performed.

As illustrated in FIGS. 3, 4, and 12, in the third processing, the control part 29 detects that the cover member 40 has been displaced to a position between the open position P1 and the closed position P2 by the position detection sensor 103 during the reading by the reading part 63. When it is detected that the cover member 40 has been displaced to the position between the open position P1 and the closed position P2, the position abnormality of the cover member 40 is notified to the display part 33 as predetermined processing. Therefore, when the cover member 40 is not at the open position P1 even though the reading by the reading part 63 is being performed, the position abnormality of the cover member 40 can be notified to the user.

In the third processing, when it is detected that the cover member 40 has been displaced to the position between the open position P1 and the closed position P2, the control part 29 performs open drive processing in which the drive source 47 is caused to displace the position of the cover member 40 to the open position P1 as predetermined processing. When the position detection sensor 103 detects that the cover member 40 is not at the open position P1 as a result of the open drive processing, the control part 29 causes the display part 33 to notify the position abnormality of the cover member 40. Therefore, when the cover member 40 is not displaced to the open position P1 due to, for example, an object placed on the cover member 40 even through the displacement of the cover member 40 is performed by the drive source 47, the user can be notified of the position abnormality of the cover member 40.

Fourth Processing

The routine of the fourth processing will be described with reference to FIG. 16. The fourth processing may be performed periodically while the reading apparatus 10 is powered on.

Figure 16:
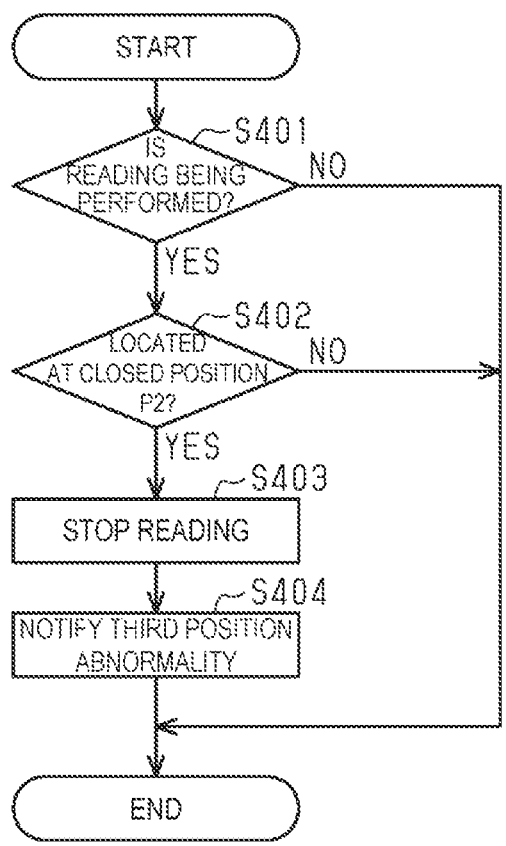
FIG. 16 is a flowchart illustrating a fourth processing routine.

As illustrated in FIG. 16, in Step S401, the control part 29 determines whether the reading part 63 is performing the reading. When the control part 29 determines that the reading part 63 is not performing the reading, Step S401 becomes NO. The control part 29 ends the routine of the fourth processing. When the control part 29 determines that the reading part 63 is performing the reading, Step S401 becomes YES. The control part 29 shifts the processing to Step S402.

In Step S402, the control part 29 determines whether or not the cover member 40 is at the closed position P2. In Step S402, when the position detection sensor 103 detects that the cover member 40 is at the closed position P2, the control part 29 may determine that the cover member 40 is at the closed position P2. When the position detection sensor 103 detects either that the cover member 40 is at a position between the open position P1 and the closed position P2 or that the cover member 40 is at the open position P1, the control part 29 may determine that the cover member 40 is not at the closed position P2. When the control part 29 determines that the cover member 40 is not at the closed position P2, Step S402 becomes NO. The control part 29 ends the routine of the fourth processing. When the control part 29 determines that the cover member 40 is at the closed position P2, Step S402 becomes YES. The control part 29 shifts the processing to Step S403.

In Step S403, the control part 29 stops the reading by the reading part 63. The control part 29 shifts the processing to Step S404. In Step S404, the control part 29 notifies a third position abnormality. In Step S404, the control part 29 causes the display part 33 as a notification part to perform notification. The control part 29 may cause the display part 33 to perform the notification, for example, by causing the display part 33 to display an error message. The error message may be the same as or different from an error message notified in other processing. After the processing in Step S404 is performed, the control part 29 ends the routine of the fourth processing.

As illustrated in FIGS. 3, 4, and 12, in the fourth processing, when the position detection sensor 103 detects that the cover member 40 is displaced to the closed position P2 during the reading by the reading part 63, the control part 29 causes the reading part 63 to stop the reading as predetermined processing. In the fourth processing, when the reading part 63 is caused to stop the reading as predetermined processing, the control part 29 causes the display part 33 to notify the position abnormality of the cover member 40. In the fourth processing, the stop of reading by the reading part 63 is performed under a situation in which the user performs the reading operation of the document 95 on the reading apparatus 10. Due to the notification by the display part 33 under such a situation, the user can recognize that the reading by the reading part 63 has been stopped due to the position abnormality of the cover member 40.

Actions of Embodiments

Actions of the embodiment will be described.

When the cover member 40 is located at the closed position P2, the cover member 40 closes the document feeding port 61. Therefore, the foreign matter is unlikely to enter the housing 11 from the document feeding port 61 compared to a case in which the document feeding port 61 is always open.

When the document 95 is read by the reading apparatus 10, the cover member 40 is displaced to the open position P1 by a user's manual operation of the cover member 40 or by a user's input to the input part 32. When the cover member 40 is located at the open position P1, the document feeding port 61 is opened. When the document 95 is read by the reading apparatus 10, the user can easily feed the document 95 to the document feeding port 61 by opening the document feeding port 61.

While the document 95 is being read by the reading apparatus 10, the cover member 40 may be displaced to the closed position P2. The displacement of the cover member 40 to the closed position P2 occurs, for example, when the user accidentally manually displaces the cover member 40 to the closed position P2. According to the embodiment, a gap 11c is formed between the opening and closing end portion 45 and the facing portion 11b when the cover member 40 is at the closed position P2. Therefore, even when the cover member 40 is displaced to the closed position P2 during the feed of the document 95 from the document feeding port 61, the document 95 can pass through the gap 11c. The document 95 is read by the reading part 63 while the document 95 is transported along the reading transport path FR after passing through the gap 11c. Even when the cover member 40 is displaced to the closed position P2 during the feed of the document 95 from the document feeding port 61, the reading of the document 95 by the reading apparatus 10 can be continued.

Effects of Embodiment

Effects of the embodiment will now be described.

(1) When the cover member 40 is at the closed position P2, the gap 11c through which the document 95 can pass is formed between the opening and closing end portion 45 located upstream in the transport direction D2 of the document 95 fed from the document feeding port 61 in the cover member 40, and the facing portion 11b that is a portion of the housing 11 facing the bottom surface 45b of the opening and closing end portion 45. Therefore, when the cover member 40 is displaced to the closed position P2 during the feed of the document 95 from the document feeding port 61, the document 95 is less likely to be sandwiched between the cover member 40 and the housing 11 in the document feeding port 61. Therefore, it is possible to suppress an increase in the transport resistance of the document 95 from the document feeding port 61 to the inside of the reading apparatus 10.

(2) When the cover member 40 is located at the closed position P2, the cover member 40 is restricted at a position at which the gap 11c is formed between the opening and closing end portion 45 and the facing portion 11b by the restriction mechanism 105. Therefore, the gap 11c can be more reliably formed between the opening and closing end portion 45 and the facing portion 11b by the restriction mechanism 105.

(3) When the cover member 40 is displaced to the closed position P2, the first contact portion 111 comes into contact with the first contacted portion 112, and thus the displacement of the cover member 40 from the closed position P2 in the closing direction is restricted. When the cover member 40 is displaced from the closed position P2 in the closing direction, the gap 11c between the opening and closing end portion 45 and the facing portion 11b narrows. The gap 11c between the opening and closing end portions 45 and the facing portion 11b can be more reliably formed by restricting the displacement of the cover member 40 in the closing direction due to the contact between the first contact portion 111 and the first contacted portion 112.

(4) When the cover member 40 is displaced to the open position P1, the second contact portion 121 comes into contact with the second contacted portion 122, and thus the displacement of the cover member 40 from the open position P1 in the opening direction is restricted. When the cover member 40 is displaced from the open position P1 in the opening direction, there is a possibility that the cover member 40 collides with the housing 11 and causes a collision sound. The generation of a collision noise caused by the cover member 40 colliding with the housing 11 can be suppressed by restricting the displacement of the cover member 40 in the opening direction due to the contact between the second contact portion 121 and the second contacted portion 122.

(5) In the cover member 40, the restriction mechanism 105 is provided at each of the central portion 40b in the width direction X, and the spaced portions 40c located away from the central portion 40b in the width direction X and located on both sides of the central portion 40b in the width direction X. Therefore, even in the cover member 40 having a large dimension in the width direction X, the gap 11c can be more reliably formed by the restriction mechanism 105.

(6) When the cover member 40 is located at the closed position P2, the displacement of the cover member 40 to the open position P1 is suppressed and the cover member 40 is maintained at the closed position P2 by the maintaining mechanism 106. When the cover member 40 is located at the open position P1, the displacement of the cover member 40 to the closed position P2 is suppressed and the cover member 40 is maintained at the open position P1 by the maintaining mechanism 106. Therefore, it is possible to more reliably maintain the cover member 40 at the open position P1 and the closed position P2.

(7) When the sliding portion 131 is located in the first sliding region 135, the cover member 40 is maintained at the open position P1. When the sliding portion 131 is located in the second sliding region 136, the cover member 40 is maintained at the closed position P2. When the cover member 40 is displaced to the open position P1 and the closed position P2, the sliding portion 131 that is a convex surface needs to get over the central region 134. Therefore, it becomes difficult for the cover member 40 to be easily displaced to the open position P1 and the closed position P2.

(8) In the cover member 40, the maintaining mechanism 106 is provided at a position between the plurality of restriction mechanisms 105 in the width direction X. Therefore, even in the cover member 40 having a large dimension in the width direction X, the maintaining mechanism 106 and the restriction mechanism 105 can more reliably maintain the cover member 40 at the closed position P2.

(9) When the cover member 40 is at the closed position P2, the upper surface of the cover member 40 is at the same height as the upper surface 16a of the housing 11. Therefore, when the cover member 40 is at the closed position P2, the upper surface 16a of the housing 11 can be used as a placement surface for placing an object.

(10) The upper surface of the cover member 40 has the scale 46. The upper surface of the cover member 40 includes the first region 42 and the second region 43 disposed side by side in the transport direction D2. The second region 43 has light shielding properties. Thus, it is possible to suppress deterioration of the performance of a sensor due to light entering the inside of the housing 11 from the document feeding port 61 hitting the sensor located inside the housing 11. When the document 95 is fed from the document feeding port 61, the scale 46 allows the user to recognize the size of the document 95.

(11) Since the first region 42 has light transmitting properties, the user can visually recognize the document 95 via the first region 42 of the cover member 40 when the document 95 is fed from the document feeding port 61. (12) Since the gap 11c is formed between the opening and closing end portion 45 and the facing portion 11b when the cover member 40 is at the closed position P2, the generation of the collision noise caused by the cover member 40 colliding with the housing 11 when the cover member 40 is displaced from the open position P1 to the closed position P2 can be suppressed.

(13) When the document 95 is not fed to the document feeding port 61 after the cover member 40 is displaced from the closed position P2 that closes the document feeding port 61 to the open position P1 that opens the document feeding port 61, foreign matter may enter the housing 11 from the document feeding port 61. According to the embodiment, when the time during which the reading part 63 does not perform reading exceeds the predetermined time Tp, and the position detection sensor 103 detects that the cover member 40 is at the open position P1, the control part 29 causes the drive source 47 to displace the cover member 40 to the closed position P2. Therefore, since the time during which the cover member 40 is at the open position P1 can be shortened even though the reading by the reading part 63 is not performed, the intrusion of foreign matter into the housing 11 from the document feeding port 61 can be suppressed.

(14) When the result detected by the position detection sensor 103 indicates that the cover member 40 has been displaced, the control part 29 performs predetermined processing. Therefore, it is possible to perform the predetermined processing according to the displacement of the cover member 40.

(15) When the position detection sensor 103 detects that the cover member 40 is displaced to a position between the open position P1 and the closed position P2 during reading by the reading part 63, the control part 29 causes the display part 33 to notify the position abnormality of the cover member 40 as the predetermined processing. Therefore, the user can be promoted to displace the cover member 40 to the open position P1.

(16) When the position detection sensor 103 detects that the cover member 40 is displaced to a position between the open position P1 and the closed position P2 during reading by the reading part 63, the control part 29 performs the open drive processing as the predetermined processing. Thus, reading by the reading part 63 can be performed while the cover member 40 is at the open position P1.

(17) When the position detection sensor 103 detects that the cover member 40 is not at the open position P1 as a result of the open drive processing, the display part 33 is caused to notify the position abnormality of the cover member 40. Therefore, the user can be prompted to manually displace the cover member 40 to the open position P1.

(18) When the position detection sensor 103 detects that the cover member 40 is displaced to the closed position P2 during reading by the reading part 63, the control part 29 causes the reading part 63 to stop reading as the predetermined processing. Thus, the bending of the document 95 caused by the reading performed in a state in which the cover member 40 is at the closed position P2 can be suppressed.

(19) After the reading by the reading part 63 is stopped as the predetermined processing, the control part 29 causes the display part 33 to notify the position abnormality of the cover member 40. Therefore, the user can be notified that the reading by the reading part 63 is stopped due to the predetermined processing.

(20) The control part 29 causes the drive source 47 to displace the cover member 40 to the open position P1 based on the fact that the detection part 104 detects that there is a target object at a position facing the outer surface of the housing 11. Therefore, when the user is at a position facing the outer surface of the housing 11 in order to operate the reading apparatus 10, the cover member 40 can be displaced to the open position P1 without user's operation.

(21) When the detection part 104 detects for the predetermined detection time T1 that there is a target object at a position facing the outer surface of the housing 11, the drive source 47 displaces the cover member 40 to the open position P1. Thus, when the user is at a position facing the outer surface of the housing 11 for a short time, such as when the user does not operate the reading apparatus 10, unnecessary opening of the cover member 40 can be suppressed by not displacing the cover member 40 to the open position P1.

Modified Examples

The embodiment described above may be modified as follows. The embodiment and modified examples thereof to be described below may be implemented in combination within a range in which a technical contradiction does not arise.

When the detection part 104 detects that there is a target object at a position facing the outer surface of the housing 11, the control part 29 may cause the drive source 47 to displace the cover member 40 to the open position P1, regardless of the time detected by the detection part 104. In this case, Step S102 is omitted from the routine of the first processing illustrated in FIG. 13.

The control part 29 may omit execution of the routine of the first processing illustrated in FIG. 13.

When the reading part 63 is caused to stop reading as the predetermined processing, the control part 29 may not cause the notification part to notify the position abnormality of the cover member 40. In this case, Step S404 is omitted from the routine of the fourth processing illustrated in FIG. 16.

When the position detection mechanism detects that the cover member 40 has been displaced to the closed position P2 during reading by the reading part 63, the control part 29 may omit stopping of the reading by the reading part 63 as the predetermined processing. In this case, Step S403 is omitted from the routine of the fourth processing illustrated in FIG. 16.

The control part 29 may omit the execution of the routine of the fourth processing illustrated in FIG. 16.

When the position detection mechanism detects that the cover member 40 is not at the open position P1 as a result of the open drive processing, the control part 29 may not cause the notification part to notify the position abnormality of the cover member 40. In this case, Step S305 and Step S306 are omitted from the routine of the third processing illustrated in FIG. 15.

The control part 29 may not perform the open drive processing that displaces the position of the cover member 40 to the open position P1. In this case, the processing of Steps S304 to S306 are omitted from the routine of the third processing illustrated in FIG. 15.

When the position detection mechanism detects that the cover member 40 is displaced to a position between the open position P1 and the closed position P2 during reading by the reading part 63, the control part 29 may not cause the notification part to notify the position abnormality of the cover member 40. In this case, Step S303 is omitted from the routine of the third processing illustrated in FIG. 15.

The control part 29 may omit execution of the routine of the third processing illustrated in FIG. 15.

When the position detection mechanism detects that the cover member 40 is displaced from the open position P1 in the opening direction, the control part 29 may cause the notification part to notify the position abnormality of the cover member 40. This processing allows the cover member 40 to be displaced from the open position P1 in the opening direction to suppress deformation of the cover member 40. This processing may be performed periodically under a situation in which the power source of the reading apparatus 10 is on. A situation in which the cover member 40 is displaced from the open position P1 in the opening direction may include, for example, a situation in which the user accidentally displaces the cover member 40 located at the open position P1 in the opening direction.

The number of position detection sensors 103 included in the reading apparatus 10 may be one or three or more.

The position detection mechanism is not limited to the position detection sensor 103. For example, the position detection mechanism may be an encoder.

When the control part 29 does not perform the predetermined processing performed based on the results detected by the position detection mechanism, the position detection mechanism may be omitted from the reading apparatus 10.

The notification part for notifying information is not limited to the display part 33. For example, the notification part may perform the notification of information by voice, or may be performed by flashing or the like.

When the notification of information by the notification part is unnecessary, the notification part may be omitted from the reading apparatus 10.

In the routine of the second processing illustrated in FIG. 14, the control part 29 may displace the cover member 40 to the closed position P2 on a condition that the cover member 40 is at the open position P1 at the timing when the state in which reading is not performed exceeds the predetermined time Tp. In this case, in the routine of the second processing illustrated in FIG. 14, the processing of Step S201 is moved between Step S203 and Step S204. When the routine of the second processing starts, the control part 29 determines whether the reading is not performed in Step S202. When Step S202 becomes YES, the processing is shifted to Step S203. In Step S203, the control part 29 determines whether or not the state in which reading is not performed exceeds the predetermined time Tp. When Step S203 becomes YES, the processing is shifted to Step S201. In Step S201, the control part 29 determines whether or not the cover member 40 is at the open position P1. When Step S201 becomes YES, the processing is shifted to Step S204. In Step S204, the control part 29 displaces the cover member 40 to the closed position P2 and then ends the routine. Even with such a routine of the second processing in this case, the control part 29 can cause the drive source 47 to displace the cover member 40 to the closed position P2 when the time during which the reading by the reading part 63 is not performed exceeds the predetermined time Tp and the position detection mechanism detects that the cover member 40 is at the open position P1.

The control part 29 may omit execution of the routine of the second processing illustrated in FIG. 14.

The scale 46 on the upper surface of the cover member 40 may be omitted.

The upper surface of the cover member 40 may be constituted by only one of the first region 42 and the second region 43. When the upper surface of the cover member 40 is constituted by only the first region 42, the entire upper surface of the cover member 40 has light transmitting properties. When the upper surface of the cover member 40 is constituted by only the second region 43, the entire upper surface of the cover member 40 has light shielding properties.

When the cover member 40 is at the closed position P2, the upper surface of the cover member 40 may be lower than the upper surface 16a of the housing 11.

When the cover member 40 is at the closed position P2, the upper surface of the cover member 40 may be higher than the upper surface 16a of the housing 11.

In the cover member 40, a distance between the rotating shaft 40a and the first contact portion 111 may be greater than or equal to a distance between the rotating shaft 40a and the opening and closing end portion 45.

In the cover member 40, the position of the maintaining mechanism 106 is not limited to the position between the plurality of restriction mechanisms 105 in the width direction X. For example, the maintaining mechanism 106 may be located at both end portions of the cover member 40 in the width direction X. In this case, the plurality of restriction mechanisms 105 may be located between the maintaining mechanism 106 located at one end in the width direction X and the maintaining mechanism 106 located at the other end.

The maintaining mechanism 106 is not limited to having the sliding portion 131 located on the cover member 40 and the sliding surface 132 located on the housing 11. For example, the maintaining mechanism 106 may be a contact portion and a contacted portion which come into contact with each other. The position of the cover member 40 may be maintained by bringing the contact portion and the contacted portion in contact with each other when the cover member 40 is at the open position P1 and when the cover member 40 is at the closed position P2.

The number of maintaining mechanisms 106 included in the reading apparatus 10 may be one or three or more.

The maintaining mechanism 106 may be omitted from the reading apparatus 10.

In the cover members 40, the restriction mechanism 105 may be located at one or more locations other than the central portion 40b and the spaced portions 40c. Formation of the restriction mechanism 105 on at least one of the central portion 40b and the spaced portions 40c may be omitted. In short, the restriction mechanism 105 may be located at a plurality of positions separated from each other in the width direction X.

The second contact portion 121 and the second contacted portion 122 may be omitted from the restriction mechanism 105. In this case, the restriction mechanism 105 can restrict the displacement of the cover member 40 from the closed position P2 in the closing direction due to the contact between the first contact portion 111 and the first contacted portion 112 when the cover member 40 is at the closed position P2.

The restriction mechanism 105 is not limited to having the first contact portion 111, the first contacted portion 112, the second contact portion 121, and the second contacted portion 122. For example, the restriction mechanism 105 may be the sliding portion and the slid portion that slide against each other. When the cover member 40 is at the closed position P2, the displacement of the cover member 40 from the closed position P2 in the closing direction due to sliding between the sliding portion and the slid portion may be restricted. When the cover member 40 is at the open position P1, the displacement of the cover member 40 from the open position P1 in the opening direction due to sliding between the sliding portion and the slid portion may be restricted.

The number of restriction mechanisms 105 included in the reading apparatus 10 may be one, two, or four or more.

The restriction mechanism 105 may be omitted from the reading apparatus 10.

The cover member 40 is not limited to one that is displaced between the open position P1 and the closed position P2 by rotating about the rotating shaft 40a. For example, the cover member 40 may slide to the open position P1 and the closed position P2.

The drive source 47 may be omitted from the reading apparatus 10. The cover member 40 in this case can be manually displaced between the open position P1 and the closed position P2 by the user.

Supplementary Note

Hereinafter, technical concepts and effects thereof that are understood from the above-described embodiment and modified examples will be described.

(A) A reading apparatus includes a reading part that reads information of a document, a housing that accommodates the reading part, a document feeding port formed in an upper surface of the housing to feed the document therethrough, and a cover member disposed on the housing to be displaced to an open position at which the document feeding port is opened and a closed position at which the document feeding port is closed, wherein the cover member includes an opening and closing end portion on the upstream side in a transport direction of the document fed from the document feeding port, the housing includes a facing portion that is a portion facing a bottom surface of the opening and closing end portion when the cover member is at the closed position, and a gap through which the document passes is formed between a part or the whole of the bottom surface of the opening and closing end portion and the facing portion when the cover member is at the closed position.

According to such a configuration, when the cover member is at the closed position, the gap through which the document can pass is formed between the opening and closing end portion located upstream in the transport direction of the document fed from the document feeding port in the cover member, and the facing portion of the housing that is a portion facing the bottom surface of the opening and closing end portion. Therefore, when the cover member is displaced to the closed position during the feed of the document from the document feeding port, the document is less likely to be sandwiched between the cover member and the housing in the document feeding port. Therefore, it is possible to suppress an increase in the transport resistance of the document from the document feeding port to the inside of the reading apparatus.

(B) In the reading apparatus, the cover member is displaced to the open position and the closed position by rotating about a rotating shaft.

(C) In the reading apparatus, a restriction mechanism that restricts displacement of the cover member is provided, and when the cover member is at the closed position, the restriction mechanism restricts the displacement of the cover member in a closing direction in a state in which the gap is formed between a part or the whole of the bottom surface of the opening and closing end portion and the facing portion, and a plurality of restriction mechanisms are located apart from each other in a width direction intersecting the transport direction of the document fed from the document feeding port.

According to such a configuration, when the cover member is located at the closed position, the cover member is restricted by the restriction mechanism at a position at which the gap is formed between the opening and closing end portion and the facing portion. Therefore, the gap between the opening and closing end portion and the facing portion can be more reliably formed by the restriction mechanism.

(D) In the reading apparatus, the restriction mechanism includes a first contact portion located on the cover member, and a first contacted portion located on the housing, and when the cover member is at the closed position, the displacement of the cover member from the closed position in the closing direction is restricted by contact between the first contact portion and the first contacted portion.

According to such a configuration, when the cover member is displaced to the closed position, the first contact portion comes into contact with the first contacted portion, and thus the displacement of the cover member from the closed position in the closing direction is restricted. When the cover member is displaced from the closed position in the closing direction, the gap between the opening and closing end portion and the facing portion is narrowed. The gap between the opening and closing end portion and the facing portion can be formed more reliably by restricting the displacement of the cover member in the closing direction by the contact between the first contact portion and the first contacted portion.

(E) In the reading apparatus, the restriction mechanism includes a second contact portion located on the cover member, and a second contacted portion located on the housing, and when the cover member is at the open position, the displacement of the cover member from the open position in an opening direction is restricted by contact between the second contact portion and the second contacted portion.

According to such a configuration, when the cover member is displaced to the open position, the second contact portion comes into contact with the second contacted portion, and thus the displacement of the cover member from the open position in the opening direction is restricted. When the cover member is displaced from the open position in the opening direction, there is a possibility that the cover member collides with the housing, causing a collision sound. The generation of a collision noise caused by the cover member colliding with the housing can be suppressed by restricting the displacement of the cover member in the opening direction by the contact between the second contact portion and the second contacted portion.

(F) In the reading apparatus, the restriction mechanism is provided at least at a central portion of the cover member in the width direction and at spaced portions located apart from the central portion in the width direction and located on both sides of the central portion in the width direction.

According to such a configuration, the restriction mechanism is provided at the central portion of the cover member in the width direction, and the spaced portions located apart from the central portion in the width direction and located on both sides of the central portion in the width direction. Therefore, the gap can be more reliably formed by the restriction mechanism even in a cover member having a large dimension in the width direction.

(G) In the reading apparatus, a maintaining mechanism that maintains the cover member at the closed position when the cover member is at the closed position and maintains the cover member at the open position when the cover member is at the open position is provided, and a plurality of the maintaining mechanisms are located apart from each other in a width direction intersecting the transport direction of the document fed from the document feeding port.

According to such a configuration, when the cover member is located at the closed position, the displacement of the cover member to the open position is suppressed, and the cover member is maintained at the closed position by the maintaining mechanism. When the cover member is located at the open position, the displacement of the cover member to the closed position is suppressed, and the cover member is maintained at the open position by the maintaining mechanism. Therefore, the open position and the closed position of the cover member can be more reliably maintained.

(H) In the reading apparatus, the maintaining mechanism includes a sliding portion located on the cover member, and a sliding surface located on the housing, the sliding surface includes a sliding region, the sliding portion is slidable in the sliding region, the sliding region includes a central region, a first sliding region, and a second sliding region located on a side opposite to the first sliding region with the central region interposed therebetween, the sliding surface is a convex surface in which the central region protrudes toward the cover member, and the maintaining mechanism maintains the cover member at the open position when the sliding portion is located in the first sliding region and maintains the cover member at the closed position when the sliding portion is located in the second sliding region.

According to such a configuration, when the sliding portion is located in the first sliding region, the cover member is maintained at the open position. When the sliding portion is located in the second sliding region, the cover member is maintained at the closed position. When the cover member is displaced to the open position and the closed position, the sliding portion needs to get over the central region that is a convex surface. Therefore, it becomes difficult for the cover member to be easily displaced to the open position and the closed position.

(I) In the reading apparatus, a restriction mechanism that restricts the displacement of the cover member is provided, the restriction mechanism restricts the displacement of the cover member in the closing direction in a state in which the gap is formed between a part or the whole of the bottom surface of the opening and closing end portion and the facing portion when the cover member is at the closed position, a plurality of the restriction mechanisms are located apart from each other in the width direction, and each of the maintaining mechanisms is provided at a position between the plurality of restriction mechanisms in the width direction in the cover member.

According to such a configuration, the maintaining mechanism is provided at a position between the plurality of restriction mechanisms in the width direction in the cover members. Therefore, even in a cover member having a large dimension in the width direction, the maintaining mechanism and the restriction mechanism can more reliably maintain the cover member at the closed position.

(J) In the reading apparatus, when the cover member is at the closed position, an upper surface of the cover member is at the same height as an upper surface of the housing or is lower than the upper surface of the housing.

According to such a configuration, when the cover member is at the closed position, the upper surface of the cover member is at the same height as or is lower than the upper surface of the housing. Therefore, when the cover member is at the closed position, the upper surface of the housing can be used as a placement surface for placing objects.

(K) In the reading apparatus, the upper surface of the cover member has a scale in a width direction intersecting the transport direction of the document fed from the document feeding port, the upper surface of the cover member has a first region and a second region disposed side by side in the transport direction, the first region is a region located at a tip end of the opening and closing end portion with respect to the second region, the first region has light transmitting properties, and the second region has light shielding properties.

According to such a configuration, the upper surface of the cover member has a scale. The upper surface of the cover member has the first region and the second region disposed side by side in the transport direction. The second region has light shielding properties. Thus, it is possible to suppress deterioration in the performance of the sensor due to the light entering the housing from the document feeding port hitting the sensor located inside the housing. When the document is fed from the document feeding port, the scale allows the user to recognize the size of the document.

(L) A complex machine includes a recording part that performs recording on a medium, a reading part that reads information of a document, a housing that accommodates the recording part and the reading part, a document feeding port formed in an upper surface of the housing to feed the document therethrough, and a cover member that is disposed on the housing and is displaceable to an open position at which the document feeding port is opened and a closed position at which the document feeding port is closed, wherein the cover member includes an opening and closing end portion on an upstream side in a transport direction of the document fed from the document feeding port, the housing includes a facing portion that is a portion facing a bottom surface of the opening and closing end portion when the cover member is at the closed position, and when the cover member is at the closed position, a gap through which the document passes is formed between a part or the whole of the bottom surface of the opening and closing end portion and the facing portion.

According to such a configuration, when the cover member is at the closed position, the gap through which the document can pass is formed between the opening and closing end portion located upstream in the transport direction of the document fed from the document feeding port in the cover member, and the facing portion of the housing that is a portion facing the bottom surface of the opening and closing end portion. Therefore, when the cover member is displaced to the closed position during the feed of the document from the document feeding port, the document is less likely to be sandwiched between the cover member and the housing in the document feeding port. Therefore, an increase in transport resistance of the document from the document feeding port to the inside of the reading apparatus can be suppressed.

What is claimed is:

1. A reading apparatus, comprising:
    a reading part configured to read information of a document;
    a housing configured to accommodate the reading part;
    a document feeding port formed at an upper surface of the housing to feed the document therethrough; and
    a cover member that is disposed at the housing and is displaceable to an open position at which the document feeding port is open and to a closed position at which the document feeding port is closed, wherein
    the cover member includes an opening and closing end portion upstream in a transport direction of the document fed from the document feeding port, the cover member being displaceable to the open position and to the closed position by having a first end that rotates about a rotating shaft and a second end that is opposite of the first end and that covers the document feeding port when the cover is in the closed position and that is separated from the document feeding portion when the cover is in the open position,
    the housing includes a facing portion that is a portion facing a bottom surface of the opening and closing end portion when the cover member is at the closed position, and
    a gap through which the document passes is formed between the facing portion and a part or a whole of the bottom surface of the opening and closing end portion when the cover member is at the closed position.

2. The reading apparatus according to claim 1, comprising a plurality of restriction mechanisms configured to restrict displacement of the cover member, wherein
when the cover member is at the closed position, the restriction mechanism restricts displacement of the cover member in a closing direction in a state in which the gap is formed between the facing portion and a part or a whole of the bottom surface of the opening and closing end portion, and
the plurality of restriction mechanisms are located apart from each other in a width direction intersecting the transport direction of the document fed from the document feeding port.

3. The reading apparatus according to claim 2, wherein the restriction mechanism includes a first contact portion located at the cover member and a first contacted portion located at the housing, and when the cover member is at the closed position, the restriction mechanism restricts displacement of the cover member from the closed position in the closing direction, by contact between the first contact portion and the first contacted portion.

4. The reading apparatus according to claim 3, wherein the restriction mechanism includes a second contact portion located at the cover member and a second contacted portion located at the housing, and when the cover member is at the open position, the restriction mechanism restricts displacement of the cover member from the open position in an opening direction, by contact between the second contact portion and the second contacted portion.

5. The reading apparatus according to claim 2, wherein the restriction mechanism is provided at least at a central portion of the cover member in the width direction and at spaced portions located apart from the central portion in the width direction and located on both sides of the central portion in the width direction.

6. The reading apparatus according to claim 1, comprising a plurality of maintaining mechanisms configured to maintain the cover member at the closed position when the cover member is at the closed position, and to maintain the cover member at the open position when the cover member is at the open position, wherein
the plurality of maintaining mechanisms are located apart from each other in a width direction intersecting the transport direction of the document fed from the document feeding port.

7. The reading apparatus according to claim 6, wherein
the maintaining mechanism includes a sliding portion located at the cover member, and a sliding surface located at the housing,
the sliding surface includes a sliding region,
the sliding portion is slidable in the sliding region,
the sliding region includes a central region, a first sliding region, and a second sliding region located on an opposite side of the central region from the first sliding region,
the sliding surface is a convex surface where the central region protrudes toward the cover member, and
the maintaining mechanism maintains the cover member at the open position when the sliding portion is located at the first sliding region, and maintains the cover member at the closed position when the sliding portion is located at the second sliding region.

8. The reading apparatus according to claim 6, comprising a plurality of restriction mechanisms configured to restrict displacement of the cover member, wherein
when the cover member is at the closed position, the restriction mechanism restricts displacement of the cover member in the closing direction in a state in which the gap is formed between the facing portion and a part or a whole of the bottom surface of the opening and closing end portion,
the plurality of restriction mechanisms are located apart from each other in the width direction, and
the maintaining mechanism is respectively provided between the plurality of restriction mechanisms in the width direction in the cover member.

9. The reading apparatus according to claim 1, wherein, when the cover member is at the closed position, an upper surface of the cover member is located at a same height as an upper surface of the housing or is located lower than the upper surface of the housing.

10. The reading apparatus according to claim 1, wherein
the upper surface of the cover member has a scale in a width direction intersecting the transport direction of the document fed from the document feeding port,
the upper surface of the cover member includes a first region and a second region that are disposed side by side in the transport direction,
the first region is a region located at a tip end of the opening and closing end portion with respect to the second region,
the first region has a light transmitting property, and
the second region has a light shielding property.

11. A complex machine, comprising:
a recording part configured to perform recording on a medium;
a reading part configured to read information of a document;
a housing configured to accommodate the recording part and the reading part;
a document feeding port formed at an upper surface of the housing to feed the document therethrough; and
a cover member that is disposed at the housing and is displaceable to an open position at which the document feeding port is open and to a closed position at which the document feeding port is closed, wherein
the cover member includes an opening and closing end portion upstream in a transport direction of the document fed from the document feeding port, the cover member being displaceable to the open position and to the closed position by having a first end that rotates about a rotating shaft and a second end that is opposite of the first end and that covers the document feeding port when the cover is in the closed position and that is separated from the document feeding portion when the cover is in the open position,
the housing includes a facing portion that is a portion facing a bottom surface of the opening and closing end portion when the cover member is at the closed position, and
when the cover member is at the closed position, a gap through which the document passes is formed between the facing portion and a part or a whole of the bottom surface of the opening and closing end portion.

* * * * *